US007951520B2

(12) United States Patent
Silcoff et al.

(10) Patent No.: US 7,951,520 B2
(45) Date of Patent: *May 31, 2011

(54) POLYMERIC CHARGE ADJUVANTS IN ELECTROSTATIC INKS

(75) Inventors: Elliad Silcoff, Ramat Gan (IL); Gil Bar-Haim, Rishon le Tzion (IL); Gregory Katz, Holon (IL); Albert Teishev, Rishon le-zion (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1086 days.

This patent is subject to a terminal disclaimer.

(21) Appl. No.: 11/651,279

(22) Filed: Jan. 9, 2007

(65) Prior Publication Data

US 2008/0163788 A1    Jul. 10, 2008

(51) Int. Cl.
*G03G 9/13*    (2006.01)
(52) U.S. Cl. .................................................. 430/137.22
(58) Field of Classification Search ............. 430/137.22
See application file for complete search history.

(56) References Cited

U.S. PATENT DOCUMENTS 6,002,893 A     12/1999 Caruthers, Jr. et al.
6,376,147 B1 *   4/2002 Bonsignore et al. .......... 430/114

FOREIGN PATENT DOCUMENTS

EP          1 521 129 A2    4/2005
* cited by examiner

*Primary Examiner* — Hoa V Le

(57) ABSTRACT

Ink toners, methods of making ink, and methods of changing viscosity are disclosed.

9 Claims, 14 Drawing Sheets

POLYMERIC CHARGE ADJUVANTS IN ELECTROSTATIC INKS

CROSS REFERENCE TO RELATED APPLICATIONS

This application is related to copending U.S. utility patent application entitled "CHARGE ADJUVANTS IN ELECTROSTATIC INKS" filed Jan. 9, 2007, to Silcoff et al., and accorded application Ser. No. 11/651,281, which is entirely incorporated herein by reference.

BACKGROUND

Various techniques for electrostatic image transfer are known. One method includes the use of an intermediate transfer member. A liquid image, which includes a liquid carrier having ink particles dispersed therein, is transferred to a photoconductive member or drum and from there to a surface (e.g., a release layer or blanket) of the intermediate transfer member. The liquid image is attracted from the photoconductive surface to the surface of the intermediate transfer member. The liquid carrier is removed from the surface of the intermediate transfer member and the ink particles are compacted on the surface in the image configuration. Thereafter, the ink particles are transferred from the surface of the intermediate transfer member to a substrate in the image configuration.

Modern liquid toner electrostatic imaging began with the invention of a new class of toners referred to as ElectroInk™. This type of toner is characterized by its toner particles being dispersed in a carrier liquid, where the toner particles include a core of a polymer with fibrous extensions extending from the core. When the toner particles are dispersed in the carrier liquid in a low concentration, the particles remain separate. Although not intending to be bound by theory, when the toner develops an electrostatic image, the concentration of toner particles increases and the fibrous extensions interlock. A large number of patents and patent applications are directed toward this type of toner (e.g., U.S. Pat. Nos. 4,794,651; 4,842,974; 5,047,306; 5,407,307; 5,192,638; 5,208,130; 5,225,306; 5,264,312; 5,266,435; 5,286,593; 5,300,390; 5,346,796; 5,407,771; 5,554,476; 5,655,194; 5,792,584 and 5,5923,929 and PCT Patent publication WO/92/17823, the entire disclosures of all of which are incorporated herein by reference).

It has been discovered that this type of toner allows for high quality offset printing quality at high speed. This type of printing is described the following U.S. Pat. Nos. 4,678,317; 4,860,924; 4,980,259; 4,985,732; 5,028,964; 5,034,778; 5,047,808; 5,078,504; 5,117,263; 5,148,222; 5,157,238; 5,166,734; 5,208,130; 5,231,454; 5,255,058; 5,266,435; 5,268,687; 5,270,776; 5,276,492; 5,278,615; 5,280,326; 5,286,948; 5,289,238; 5,315,321; 5,335,054; 5,337,131; 5,376,491; 5,380,611; 5,426,491; 5,436,706; 5,497,222; 5,508,790; 5,527,652; 5,552,875; 5,555,185; 5,557,376; 5,558,970; and 5,570,193; the entire disclosures of which are incorporated herein by reference.

SUMMARY

Briefly described, embodiments of this disclosure includes ink toners, methods of making ink, methods of changing viscosity, and the like. One exemplary embodiment of an ink toner, among others, includes: a charge adjuvant, a carrier liquid, a resin, a pigment, and a charge director, wherein the charge adjuvant is a polymeric organometallic compound, and wherein the ink toner does not include aluminum stearate.

One exemplary embodiment of a method of making an ink, among others, includes: grinding a carrier liquid, a resin, and a pigment, to form a slurry; and mixing a charge adjuvant and a charge director with the ink slurry after grinding, wherein the charge adjuvant is a polymeric organometallic compound, and wherein the ink toner does not include aluminum stearate.

One exemplary embodiment of a method of making changing the viscosity of an ink, among others, includes: changing the viscosity of an electrostatic ink by adding a charge adjuvant to an ink slurry, wherein the charge adjuvant is a polymeric organometallic compound, and wherein the ink slurry does not include aluminum stearate.

BRIEF DESCRIPTION OF THE DRAWINGS

Many aspects of this disclosure can be better understood with reference to the following drawings. The components in the drawings are not necessarily to scale. Moreover, in the drawings, like reference numerals designate corresponding parts throughout the several views.

FIGS. 1A-1F illustrate graphs of the VCA reference inks at differing charging levels as opposed to graphs of similar ink prepared with POAS as a function of time.

FIGS. 2A-2F illustrate graphs of the VCA reference inks at differing charging levels as opposed to graphs of similar ink prepared with POAS. FIG. 2G-2I illustrate graphs comparing POAS and VCA at different concentrations. FIGS. 2J and 2K are three-dimensional projections of the charging of ink ground with VCA and POAS.

FIG. 3A illustrates a graph of the reference ink without any charge adjuvant at differing charging levels. FIGS. 3B-3D illustrate graphs at different levels of POAS.

FIG. 4A illustrates a graph of the reference ink where the charge adjuvant (POAS) is added first and followed by the charge director (delayed addition). FIG. 4B illustrates a graph of an ink where the CA and CD are added simultaneously (simultaneous addition). FIG. 4C illustrates a graph of ink where the CD is added prior to the charge adjuvant (reverse addition). FIG. 4D illustrates a summary graph comparing the different addition mechanisms of POAS.

DETAILED DESCRIPTION

Figure 1A:
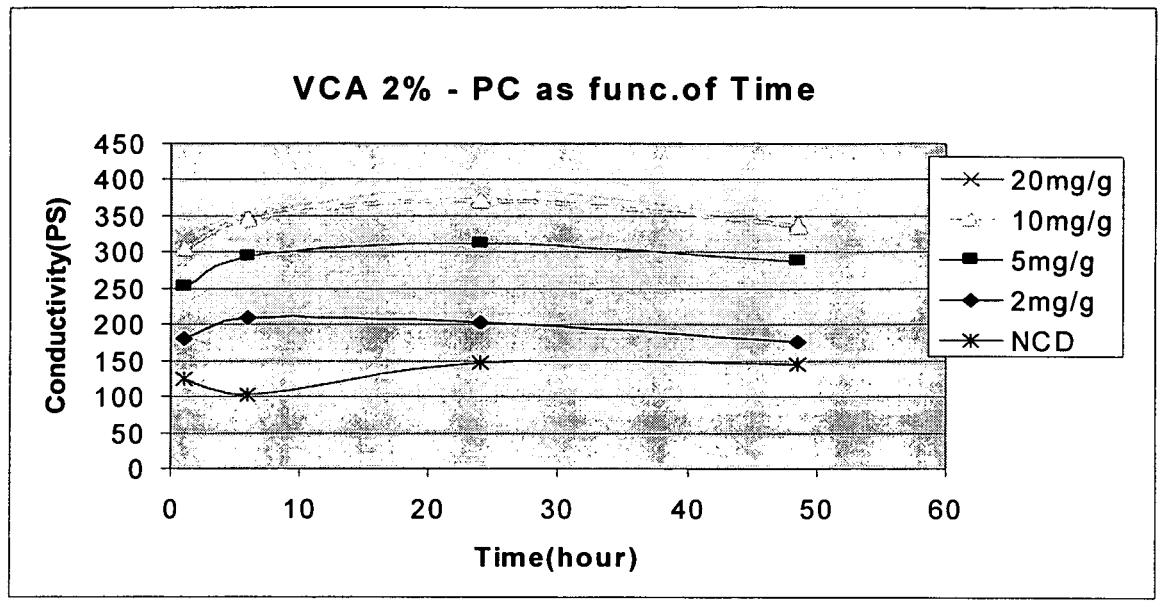
FIGS. 1A-1F illustrate graphs of embodiments of the charging of ink at differing levels of aluminum stearate (VCA) and/or polyoxoaluminum stearate (POAS) added to the grinding process as a function of time. In particular.
Figure 1B:
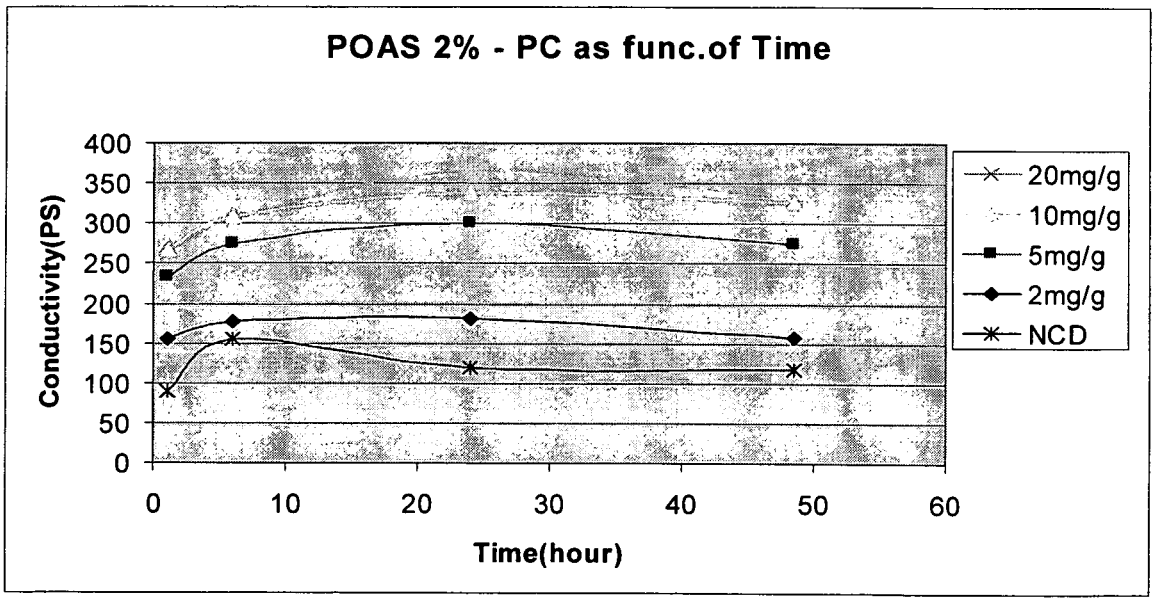
Figure 1C:
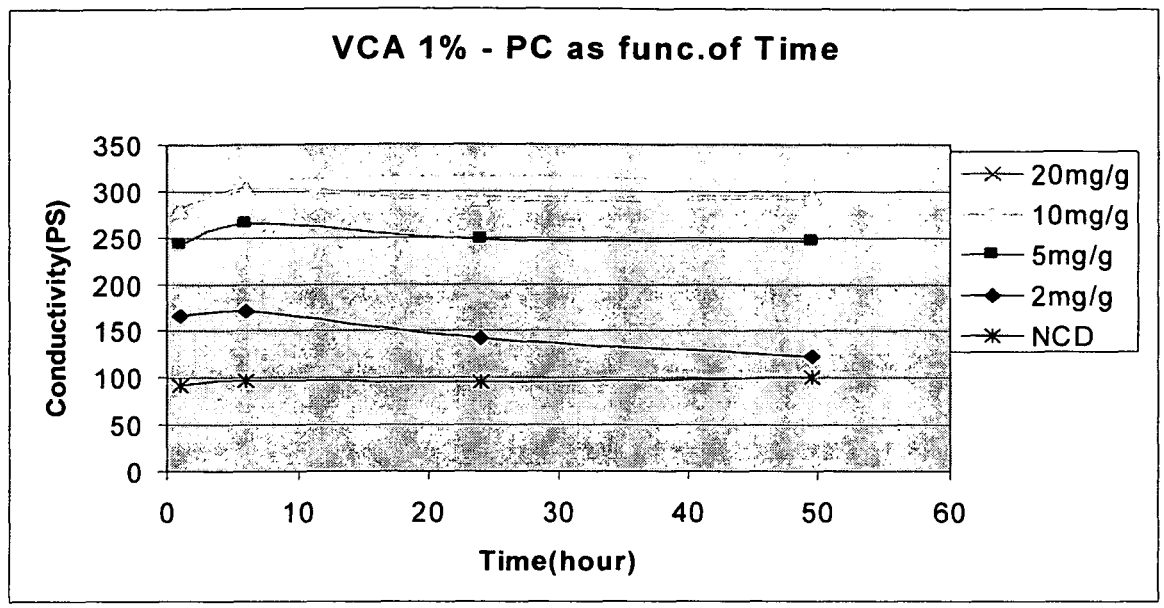
Figure 1D:
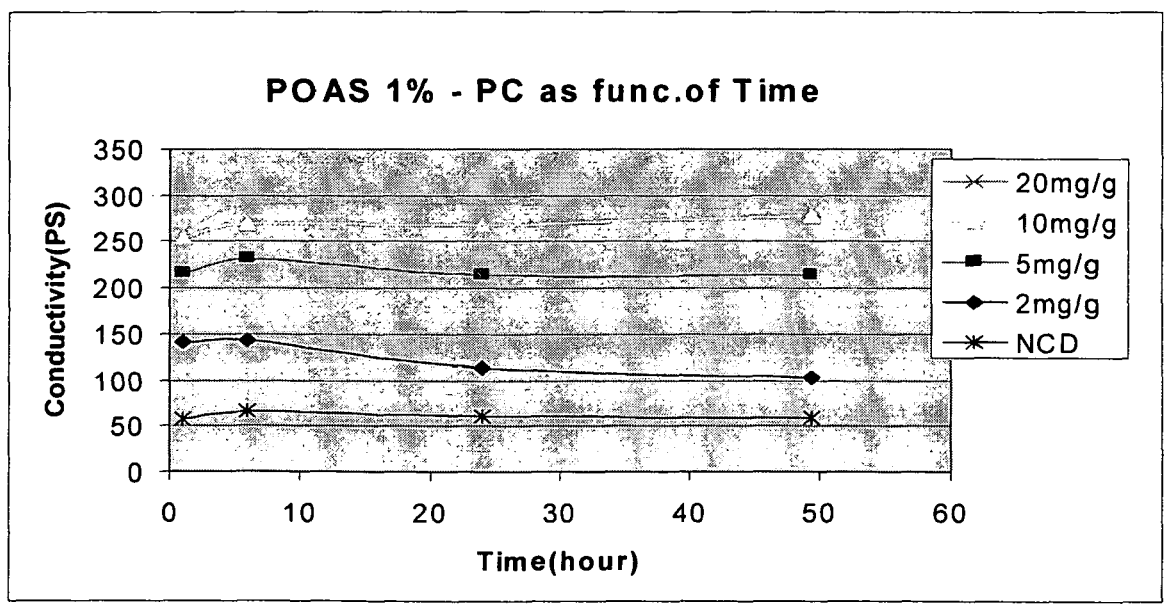
Figure 1E:
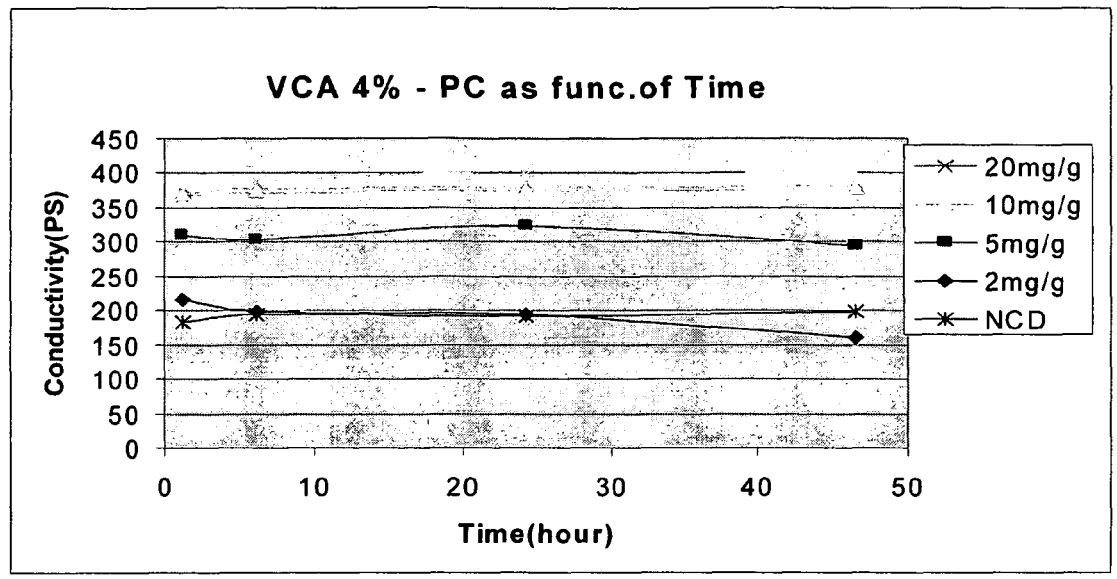
Figure 1F:
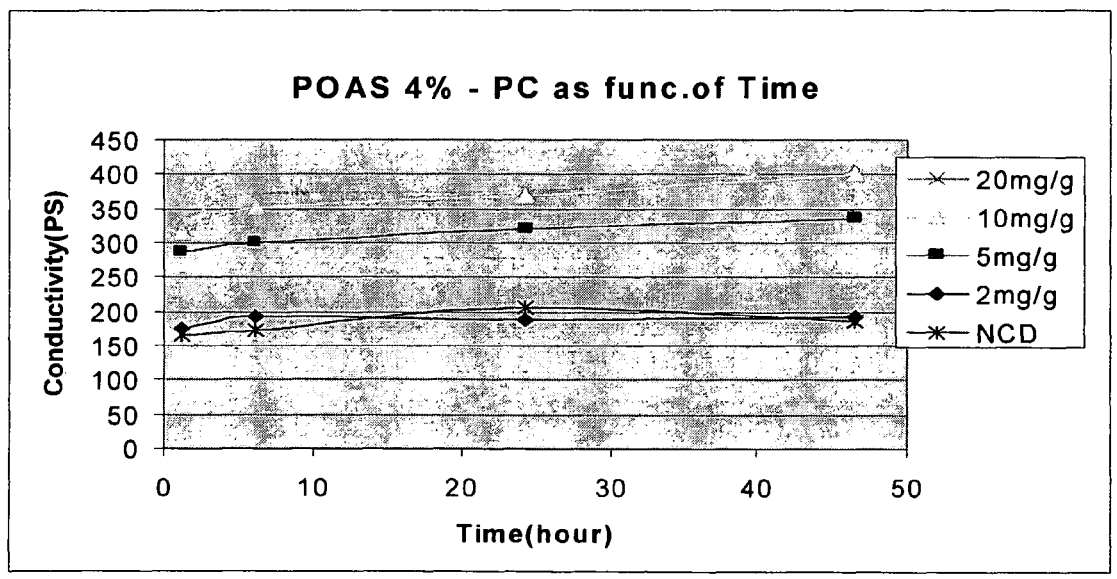

Embodiments of the present disclosure will employ, unless otherwise indicated, techniques of synthetic organic chemistry, ink chemistry, media chemistry, printing chemistry, electrochemistry, polymer chemistry, chemistry of conducting compounds, and the like, that are within the skill of the art. Such techniques are explained fully in the literature.

The following examples are put forth so as to provide those of ordinary skill in the art with a complete disclosure and description of how to perform the methods and use the compositions disclosed and claimed herein. Efforts have been made to ensure accuracy with respect to numbers (e.g., amounts, temperature, etc.) but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion

Embodiments of the present disclosure include ink toners including polymeric organometallic compounds (e.g., polyoxoaluminum stearate) as the charge adjuvant, where the polymer replaces the use of aluminum stearate as the charge adjuvant. In addition, embodiments of the present disclosure include methods of making ink toners including polymeric organometallic compounds as the charge adjuvant.

Replacing aluminum stearate with the polymeric organometallic compound enables the user to tune the characteristics (e.g., physical and/or electrical characteristics) of the ink toner. In this regard, a concentration of polymeric organometallic compound (e.g., polyoxoaluminum stearate) can be used to chemically alter the viscosity and/or the electrical characteristics of the ink toner. Further, the concentration of the charge adjuvant that is used in the ink toner is lower when the polymer is used as the charge adjuvant, which reduces cost and complexity.

In addition, the components of the ink toner can be mixed in the same manner or in a different order than previously conducted using aluminum stearate as the charge adjuvant. Typically, the charge adjuvant is added prior to grinding, but embodiments of the present disclosure provide for the former and adding polymer homogeneously to the ink toner after grinding. Additionally, the order in which the components of the ink toner are added can be changed.

In an embodiment, the polymeric organometallic compound can be added prior to grinding. In this regard, a carrier liquid and a resin are mixed in a mixer (e.g., double planetary mixer and the like). Other components such as, but not limited to, the charge adjuvant, organic/inorganic pigments, surface modifiers, and additives, can be added to the slurry at this stage and/or during the next stage. Next, the slurry is added to a grinder (e.g., an attritor, a disk mill, a sand mill, an impeller attrition mill, a vibro-energy mill, or the like), and ground for a period of time to form the ink toner. Using the polymeric organometallic compound as the charge adjuvant produces an ink toner having characteristics (e.g., physical and/or electrical characteristics) comparable to or better than ink toners including aluminum stearate as the charge adjuvant. However, the use of polymeric compounds mixed homogeneously within the grinding mixture provides for better homogenation and for singular dispersal over the particle surface. In addition the compound is a single polymer species and as such provides much better batch repeatability than aluminum stearate, which comes as a mixture of four compounds and is heterogeneous in the grinding mixture, causing much greater batch differences. Additional results and discussion are provided in the Examples.

In another embodiment, the polymeric organometallic compound can be added after grinding of components in the ink toner (e.g., the carrier liquid, the resin, and the like). Addition of the charge adjuvant after grinding allows the user to tune the characteristics of the ink toner for particular applications. The characteristics that can be tuned include, but are not limited to, viscosity, low field conductivity, high field conductivity, particle conductivity, particle size, particle mobility and combinations thereof. For example, the viscosity of the ink toner can be chemically modified (e.g., decreased) by changing the amount of charge adjuvant added to the ink toner.

In another example, a larger concentration of the charge adjuvant can be added to an ink toner having lower quality (e.g., poor quality being defined as ink which develops a low particle conductivity in standard conditions that Will exhibit itself in poor printing characteristics, low optical density, poor print quality, poor transfer of small dots, low solid consistence, poor fixing qualities, and the like), while a lower concentration of charge adjuvant can be added to an ink toner having a higher quality. In an embodiment, the amount of charge adjuvant used in the ink toner can be adjusted for the particular ink toner composition and/or use of the in ink toner in a particular developing apparatus. For example, the electrical characteristics of the ink toner can be tuned for a specific developing apparatus, since the electrical characteristics of each developing apparatus are unique. The ability to tune the ink toner enables the user to produce a superior printed product.

It should also be noted that the polymeric organometallic compound could be added prior to the charge director, after the charge director, or simultaneously with the charge director. The addition of the charge director prior to the charge adjuvant and addition of the charge adjuvant and the charge director simultaneously could not be done when the charge adjuvant is aluminum stearate. The order in which the charge adjuvant and the charge director are added may be used to modify characteristics of the ink toner. The advantages of adding the charge director prior to the charge adjuvant or adding the charge adjuvant and the charge director simultaneously include greater freedom in tuning the electrical characteristics of the charged ink. By adding the charge adjuvant first followed by the charge director provides an addition method to tune the inks electrical characteristics to the level necessary for the particular application and control the amount of molecules of the family of the charge director which can have various other side effects, both positive and negative, on the ink and printing system. Simultaneous addition provides a production protocol that requires much less capital equipment and saves time and money. Additional results and discussion are provided in the Examples.

As mentioned above, the ink toner includes, but is not limited to, a charge adjuvant, a carrier liquid, a resin, an organic/inorganic pigment, a charge director, a surface modifier, compatibility additives, charging additives, transfer additives, and other additives. As mentioned above, the charge adjuvant can be added to the mixture prior to grinding or after grinding. In addition, the charge adjuvant can be added before, after, or at the same time as the charge director. The physical and electrical characteristics are described in more detail after the components of the ink toner are described.

The charge adjuvant is a polymeric organometallic compound. The polymeric organometallic compound is soluble in carrier liquids, which permits the addition of the compound after grinding and allows a smaller amount of the polymeric organometallic compound to be added to the ink toner. The polymeric organometallic compound (e.g., 0 to about 50% weight %) is soluble in the carrier liquid.

As mentioned above, the charge adjuvant includes the polymeric organometallic compound, which can include compounds as described in formula I, formula II, or formula III:

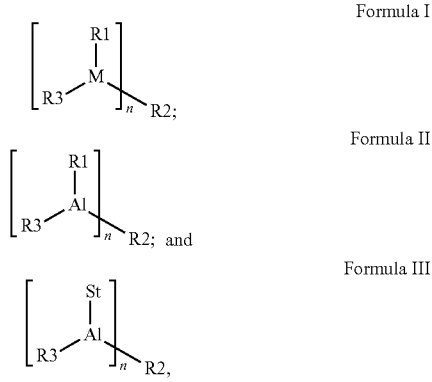

Formula I

Formula II

Formula III where M is a metal such as, but not limited to, Al, Ba, Na, Mg, Zn, Ca, Zr, Co, Cu, Fe, Ga, B, Si, In, Sn, and other d and f metals; and n is from 1 to hundreds, thousands, or more. R1 can include stearate, other deprotonated fatty acids (e.g., palmitate and arachidate fatty acids), deprotonated unsaturated fatty acids (e.g., oleate acid and eruciate fatty acids), deprtonated polyunsatuareted fatty acids (e.g., linoleiate, linolenate and arachidonate fatty acids), linear alkyl groups, branched alkyl groups, aromatics, heteroaromatrics, cyclic alkyl groups, and the like. R2 can include hydrogen, OH, or one of the R1 groups listed above. R3 can include a hydroxide, an ester, a sulfonate (e.g., methylsulfonate), a stearate, an acetate, or any one of the R1 groups listed above. Exemplary embodiments include polymers of aluminum alkoxylate salts and specifically polyoxoaluminum stearate.

The charge adjuvant is about 0 to 5% by total weight of the ink toner, 1 to 4% by total weight of the ink toner, and about 1.5 to 4% by total weight of the ink toner.

The carrier liquid can include, but is not limited to, a low dielectric constant, nonpolar liquid that is used as the medium for toner particles. The carrier liquid can usually include compounds that have a resistivity in excess of about $10^9$ ohm-cm and a dielectric constant below about 3.0, however, higher conductivities can be used as less preferred applications on presses or as working points in other applications.

The carrier liquid can include, but is not limited to, hydrocarbons, halogenated hydrocarbons, cyclic hydrocarbons, functionalized hydrocarbons (where functionalized can include alcohols, acids, esters, ethers, sulfonic acids, sulfonic acid esters, and the like). The hydrocarbon can include, but is not limited to, an aliphatic hydrocarbon, an isomerized aliphatic hydrocarbon, branched chain aliphatic hydrocarbons, aromatic hydrocarbons, and combinations thereof.

Illustrative carrier liquids include, but are not limited to, aliphatic hydrocarbon, isoparaffinic compounds, paraffinic compounds, dearomatized hydrocarbon compounds, and the like. In particular, the carrier liquids can include, but are not limited to, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and electron, positron, new II, purogen HF (100% synthetic terpenes) (sold by ECOLINK). The carrier liquid is about 55 to 99% by total weight of the ink toner.

The resin can include, but is not limited to, thermoplastic toner resins. In particular, the resin can include, but is not limited to, ethylene acid copolymers; ethylene acrylic acid copolymers; methacrylic acid copolymers; ethylene vinyl acetate copolymers; copolymers of ethylene (80 to 99.9%), acrylic, or methacrylic acid (20 to 0.1%)/alkyl (C1 to C5) ester of methacrylic or acrylic acid (0.1 to 20%); polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g., copolymer of acrylic or methacrylic acid and at least one alkyl ester of acrylic or methacrylic acid wherein alkyl is from 1 to about 20 carbon atoms, like methyl methacrylate (50 to 90%)/methacryltic acid (0 to 20 percent/ethylhexylacrylate (10 to 50%)); ethylene-acrylate terpolymers: ethylene-acrylic esters-maleic anhydride (MAH) or glycidyl methacrylate (GMA) terpolymers; low molecular weight ethylene-acrylic acid ionomers and combinations thereof.

In an embodiment, the resin can include the Nucrel family of resins (e.g., Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, and Bynell 2020 (sold by E. I. du PONT)), the Aclyn family of resins (e.g. Aaclyn 201, Aclyn 246, Aclyn 285, and Aclyn 295), and the Lotader family of resins (e.g. Lotader 2210, Lotader, 3430, and Lotader 8200 (sold by Arkema)). The resin is about 5% to 100% by total weight of the ink toner.

The colorants can include, but are not limited to, cyan colorants, magenta colorants, yellow colorants, violet colorants, orange colorants, green colorants colorants, black colorants, and combinations thereof. Colorants used in conjunction with ElectroInk® based systems are known in the art. The pigment is about 0% to 80% by total weight of the ink toner.

The charge director can include, but is not limited to, lecithin, oil-soluble petroleum sulfonates (e.g., neutral Calcium Petronate™, neutral Barium Petronate™, and basic Barium Petronate™), polybutylene succinimides (e.g., OLOA™ 1200 and Amoco 575), and glyceride salts (e.g., sodium salts of phosphated mono- and diglycerides with unsaturated and saturated acid substituents), sulfonic acid salts including, but not limited to, barium, sodium, calcium, and aluminum salts of sulfonic acid. The sulfonic acids may include, but are not limited to, alkyl sulfonic acids, aryl sulfonic acids, and sulfonic acids of alkyl succinates. In addition, the charge director as described in (PCT/US2006/018297 filed on May 10, 2006, which is incorporated herein by reference) can be used as well. The charge director is about 0.001 to 1% by total weight of the solid fraction of the ink toner.

The ink toner has a viscosity of about 50 to 2000 depending of ink particle morphology. The viscosity of the ink toner can be modified by changing the concentration of the charge adjuvant added to the ink toner. The viscosity change takes place while maintaining the original ink morphology. This can be benefit fixing qualities, usually obtainable, from lower viscosity inks, which are difficult to print. In addition, the production of ink at very low viscosities enables placing much higher concentrations in the ink cans, which has both a financial advantage and a technical advantage in that there are fewer limitations as to at what concentration the ink can be developed at.

The ink toner has a low field conductivity of about 4 to >200. The low field conductivity of the ink toner can be modified by changing the concentration of the charge adjuvant added to the ink toner.

The ink toner has a high field conductivity of about 10 to 500. The high field conductivity of the ink toner can be modified by changing the concentration of the charge adjuvant added to the ink toner. While embodiments of the present disclosure are described in connection with Examples 1-5 and the corresponding text and figures, there is no intent to limit the disclosure to the embodiments in these descriptions. On the contrary, the intent is to cover all alternatives, modifications, and equivalents included within the spirit and scope of embodiments of the present disclosure.

EXAMPLE 1

POAS by Grinding

Six inks (ink refers to ElectroInk 5.0 rev. 1.1 Cyan with the exception of the amount of charge adjuvant which will be specified for each ink prepared) with VCA and POAS at different levels of charge adjuvant, 1%, 2%, 4% were prepared by grinding in the 1 S attritor according to the accepted practices. The ground ink was diluted to 2% and was charged by different amounts of SCD (SCD refers to SCD mark IV prepared in house): 2 mg/g, 5 mg/g, 10 mg/g and 20 mg/g solids, where NCD (NCD refers to NCD 4.0) was added as reference by an addition of about 40 mg/g solids to obtain a low field conductivity of about 70 pS.

Figure 2A:
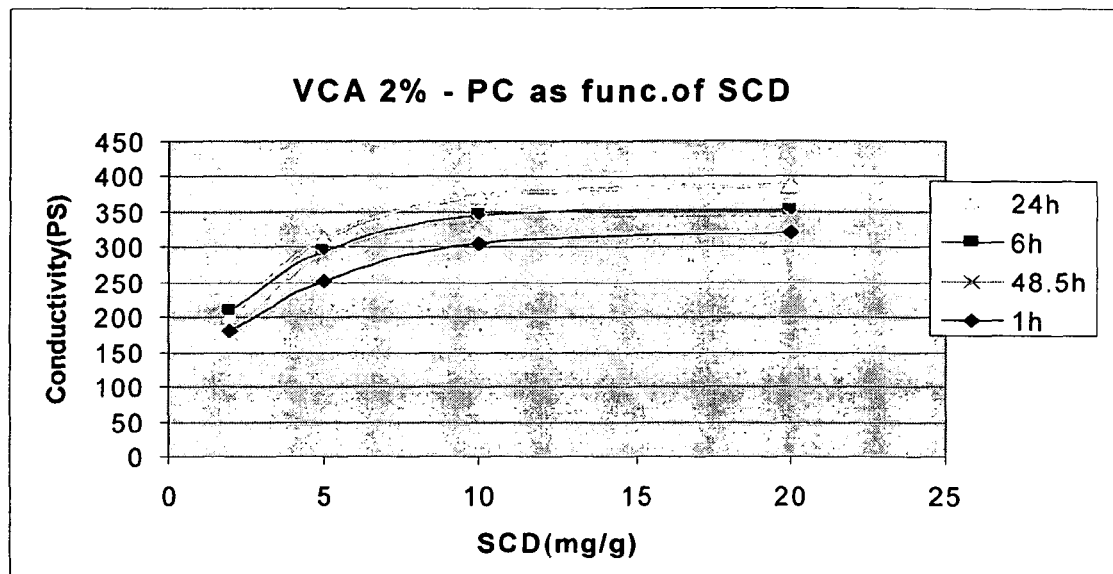
FIGS. 2A-2K illustrate graphs of embodiments of the charging of ink at differing levels of VCA and/or POAS added to the grinding process as a function of charge director concentration.
Figure 2B:
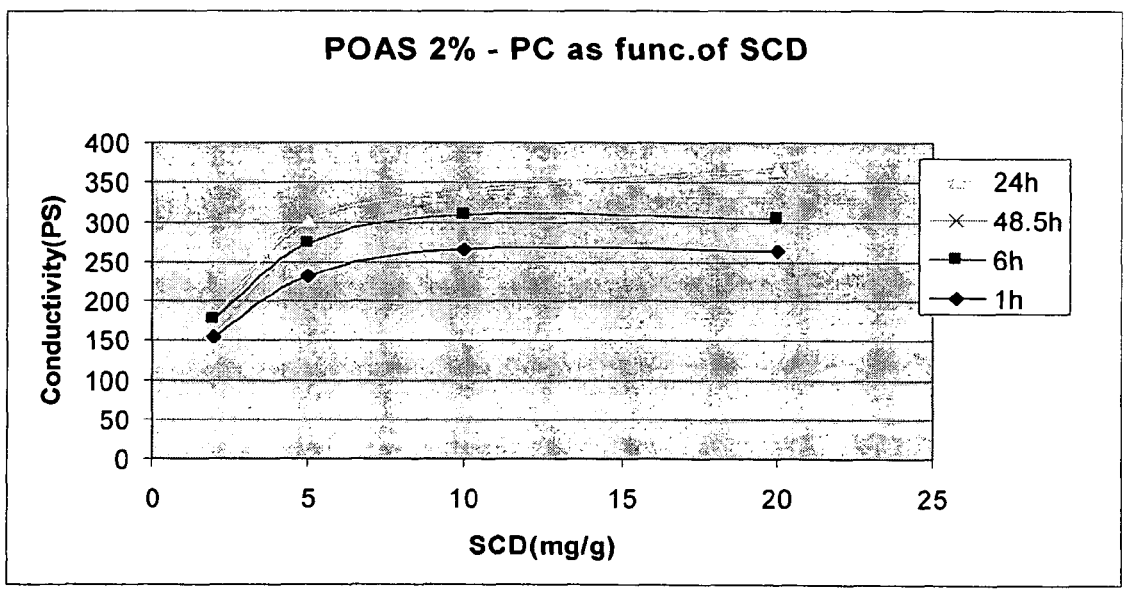
Figure 2C:
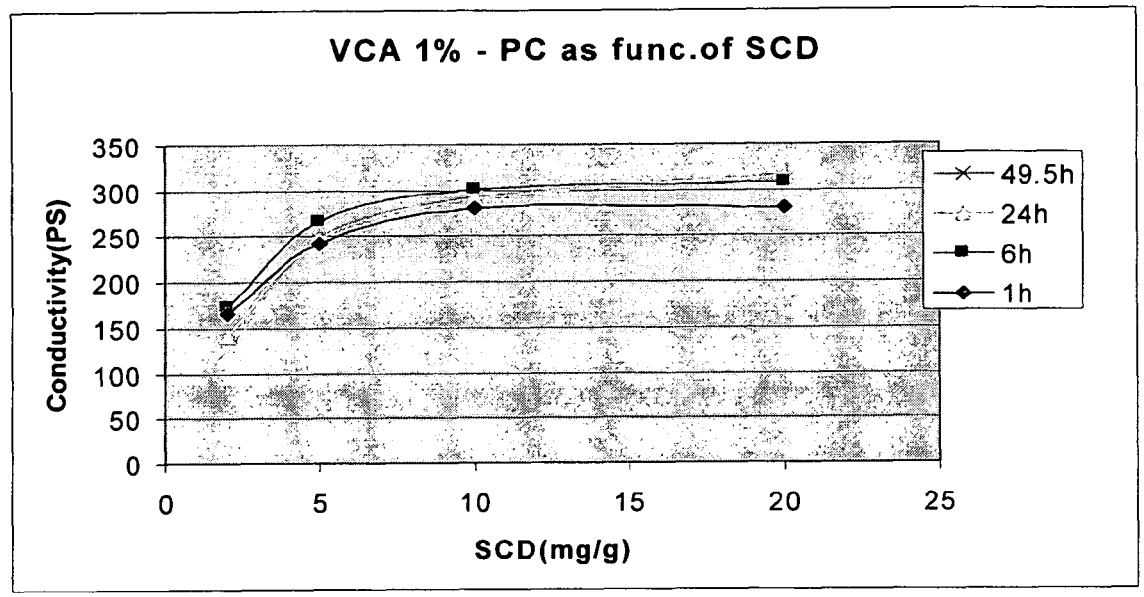
Figure 2D:
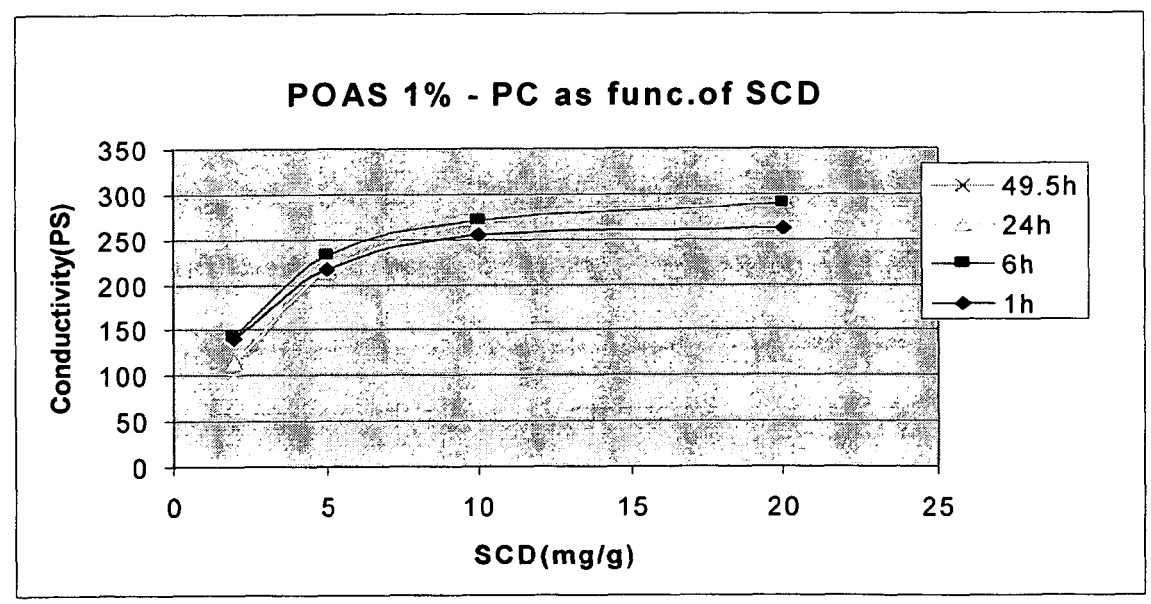
Figure 2E:
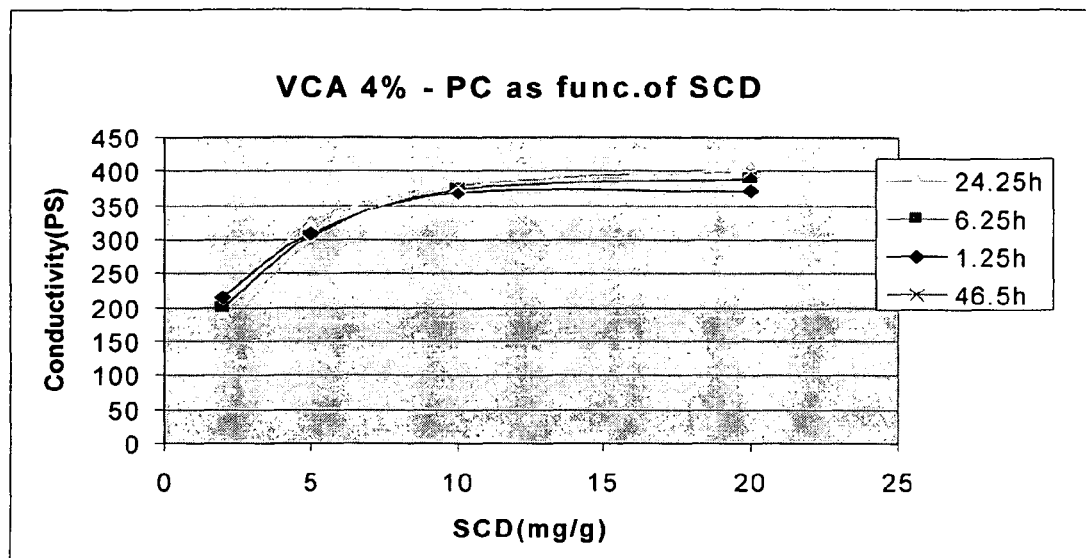
Figure 2F:
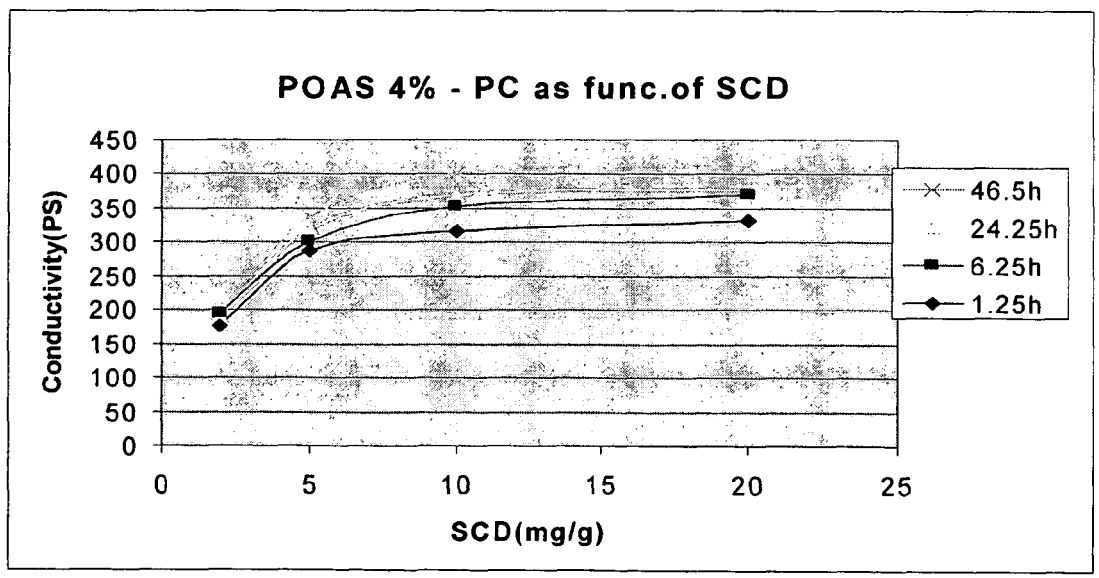
Figure 2G:
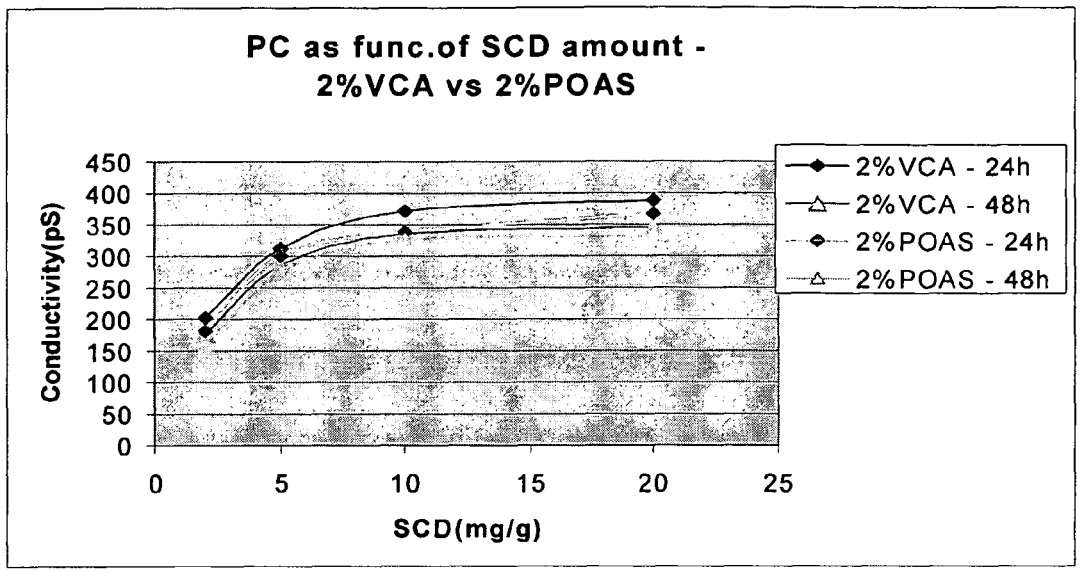
Figure 2H:
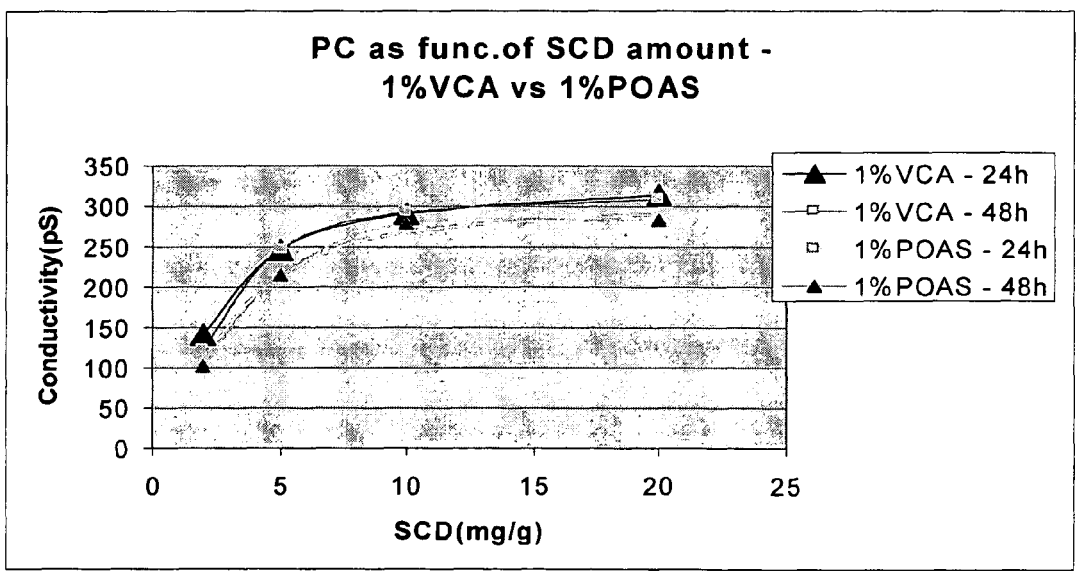
Figure 2I:
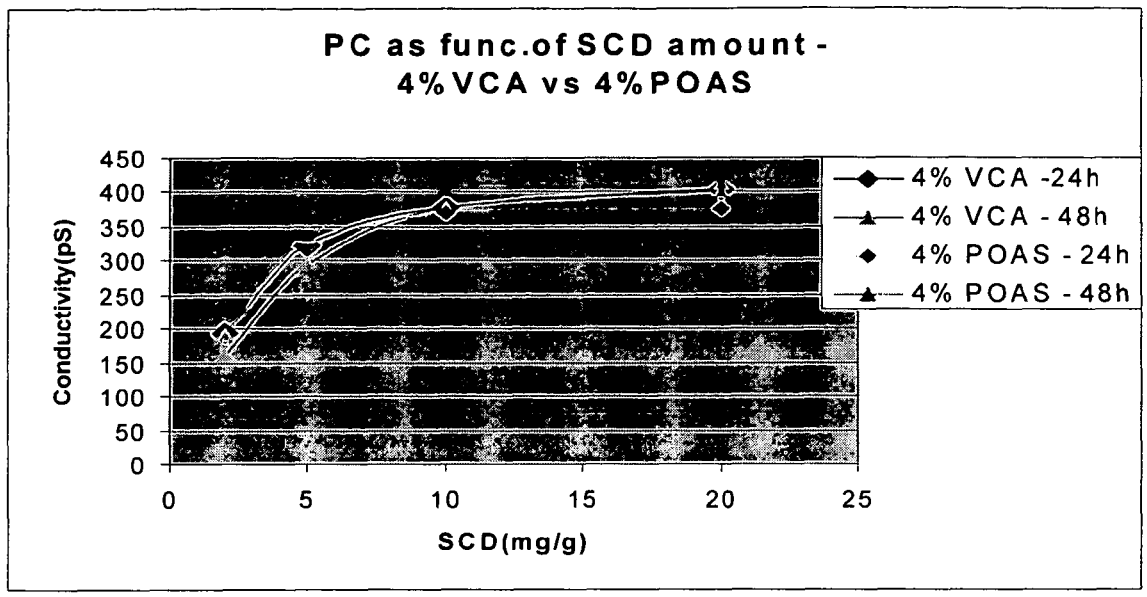
Figure 2J:
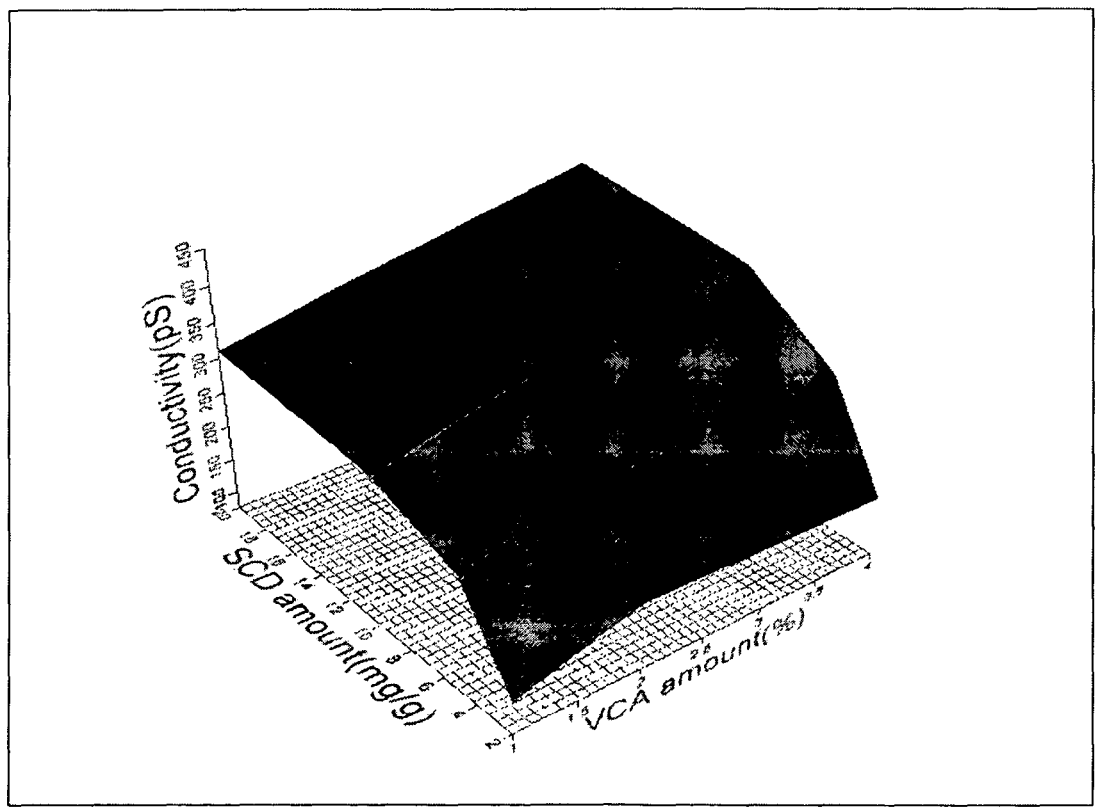
Figure 2K:
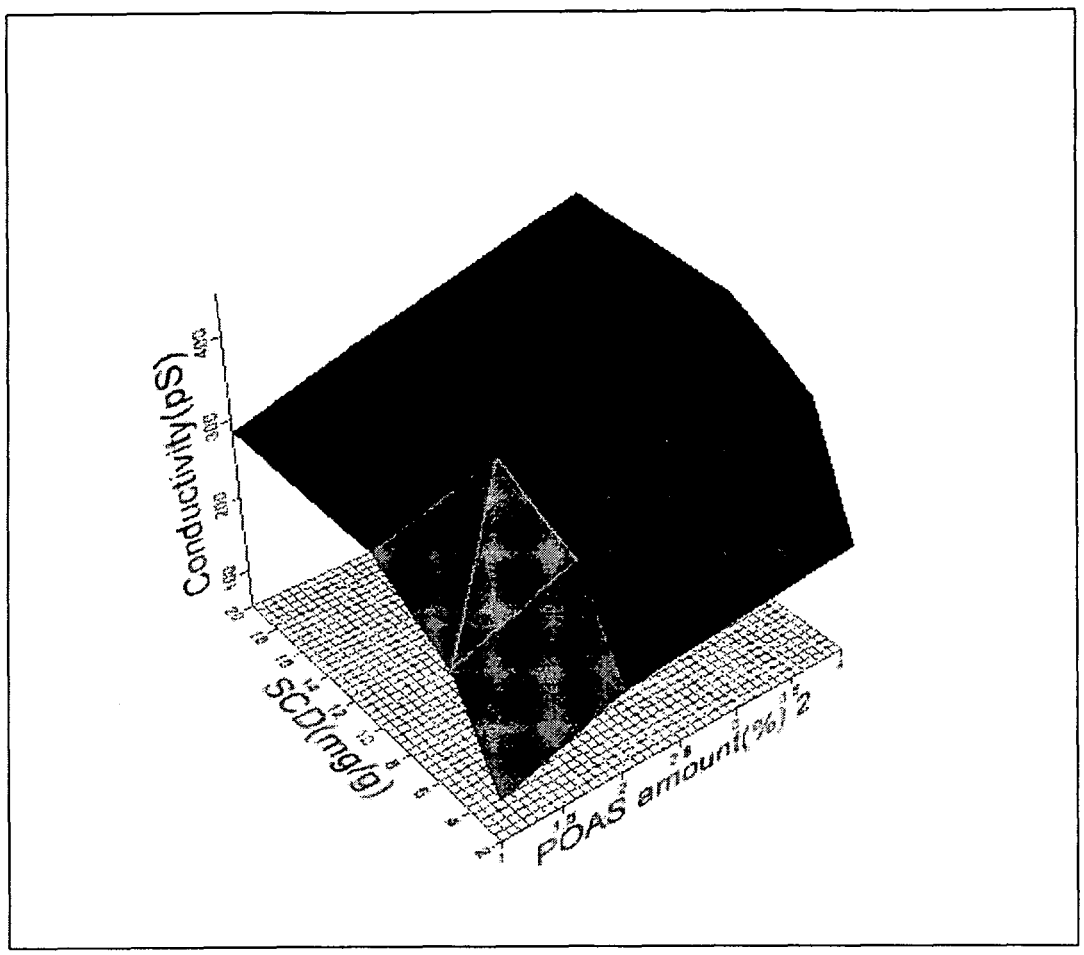
Figure 3A:
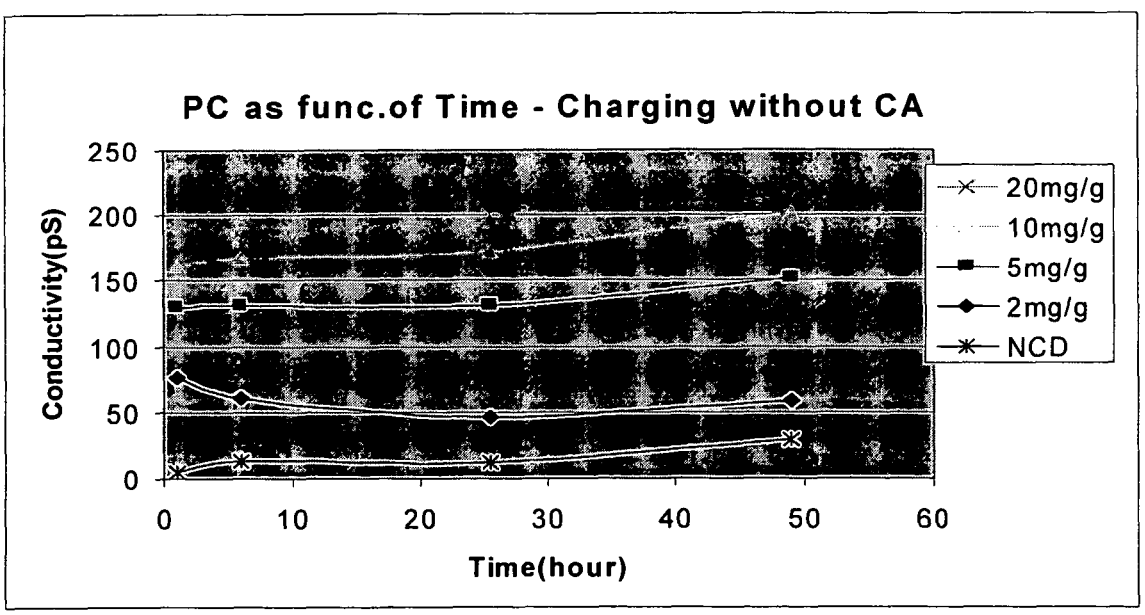
FIGS. 3A-3D illustrate graphs of embodiments of the charging of ink at differing levels of POAS added post grinding as a function of time and at different charge director concentrations.
Figure 3B:
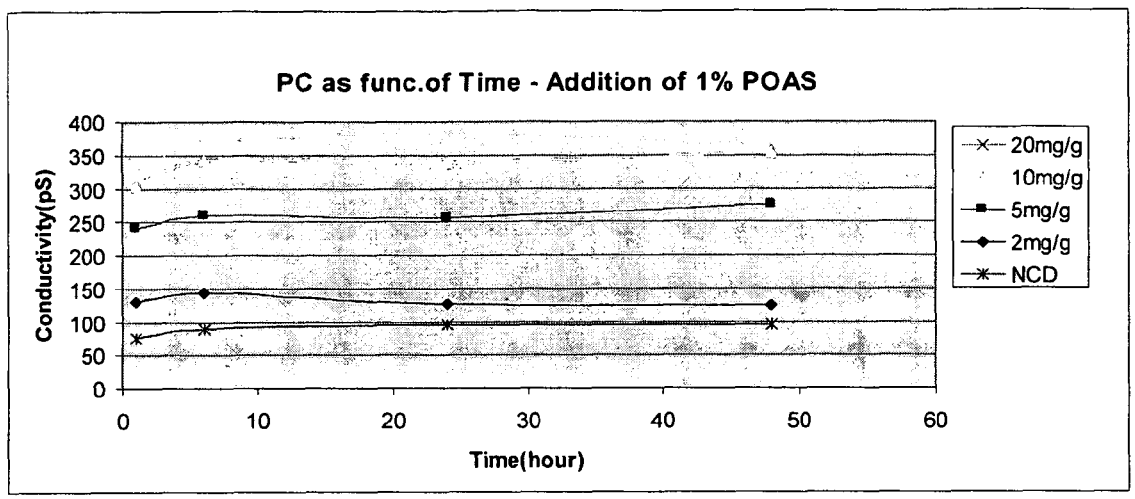
Figure 3C:
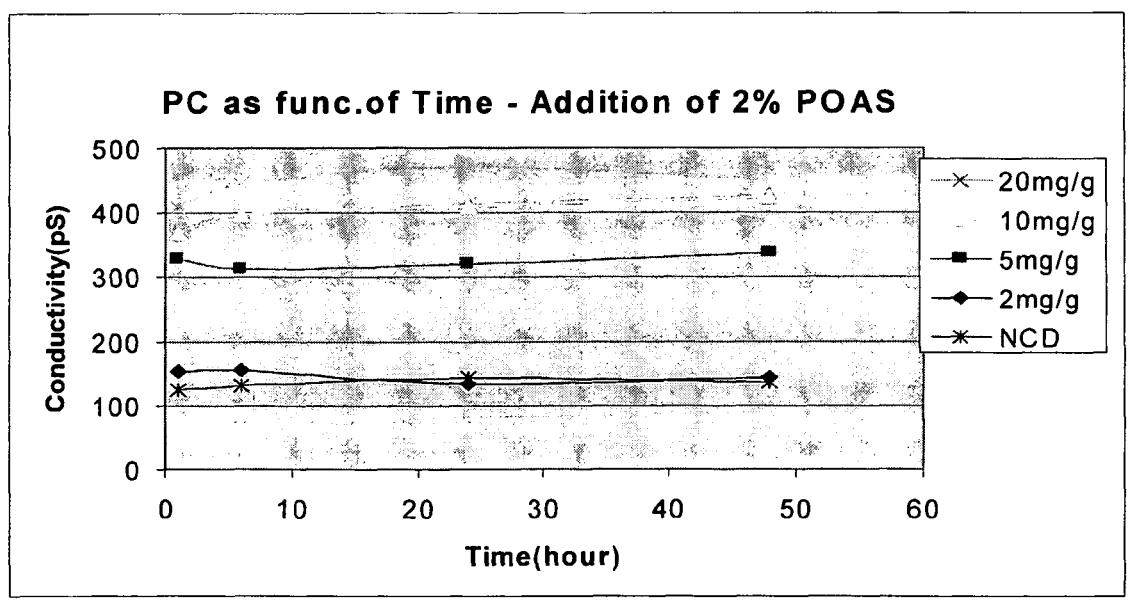
Figure 3D:
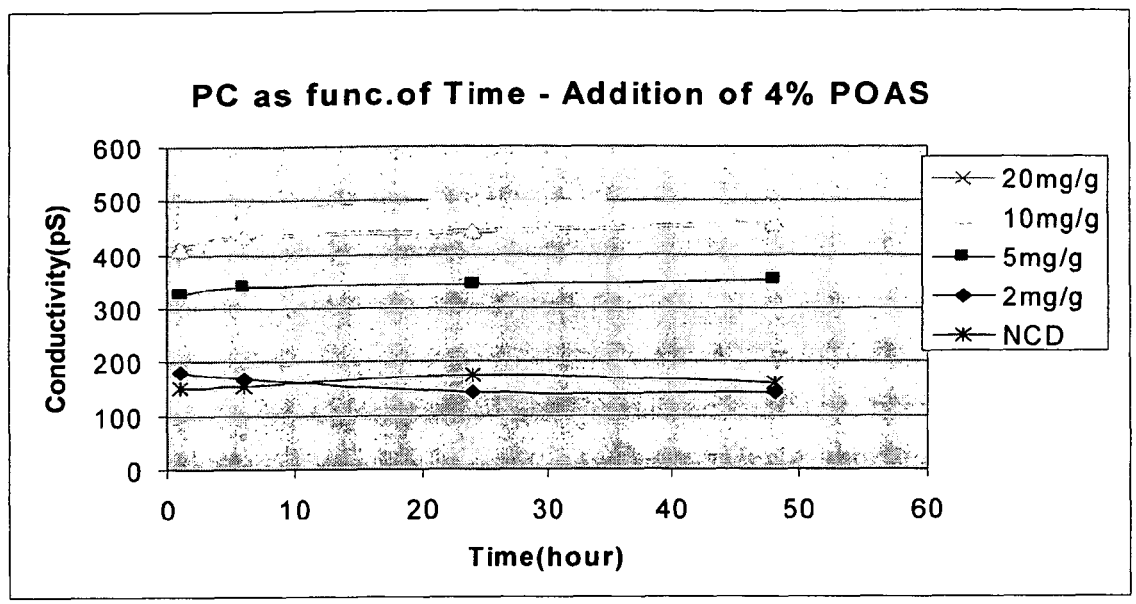
Figure 4A:
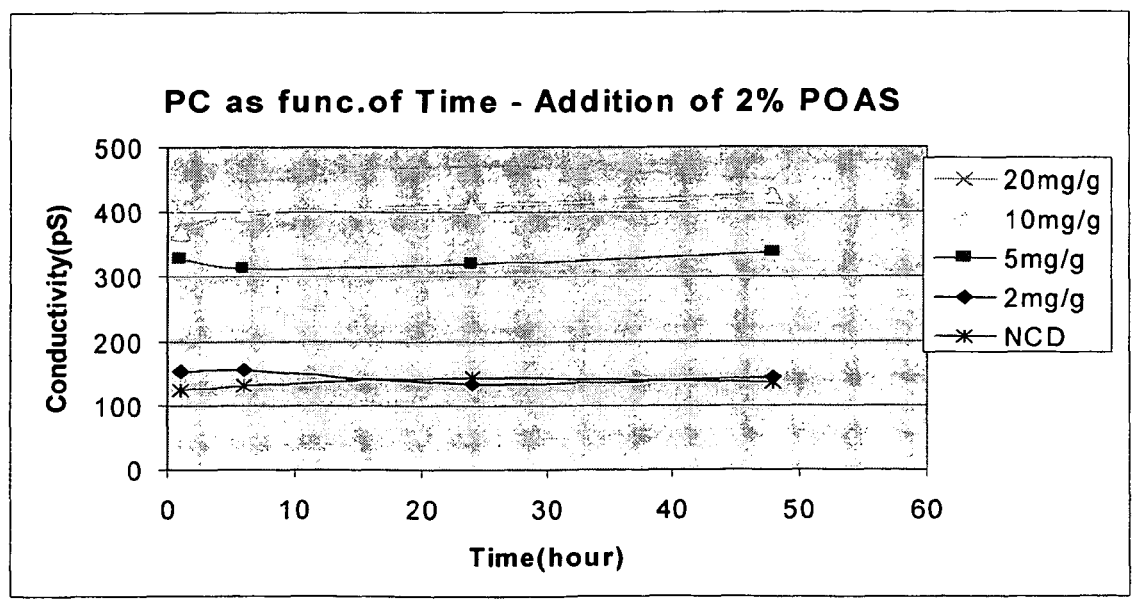
FIGS. 4A-4D illustrate graphs of embodiments of the charging of ink at differing levels of POAS added post grinding as a function of time and at different charge director concentrations using different addition methods.
Figure 4B:
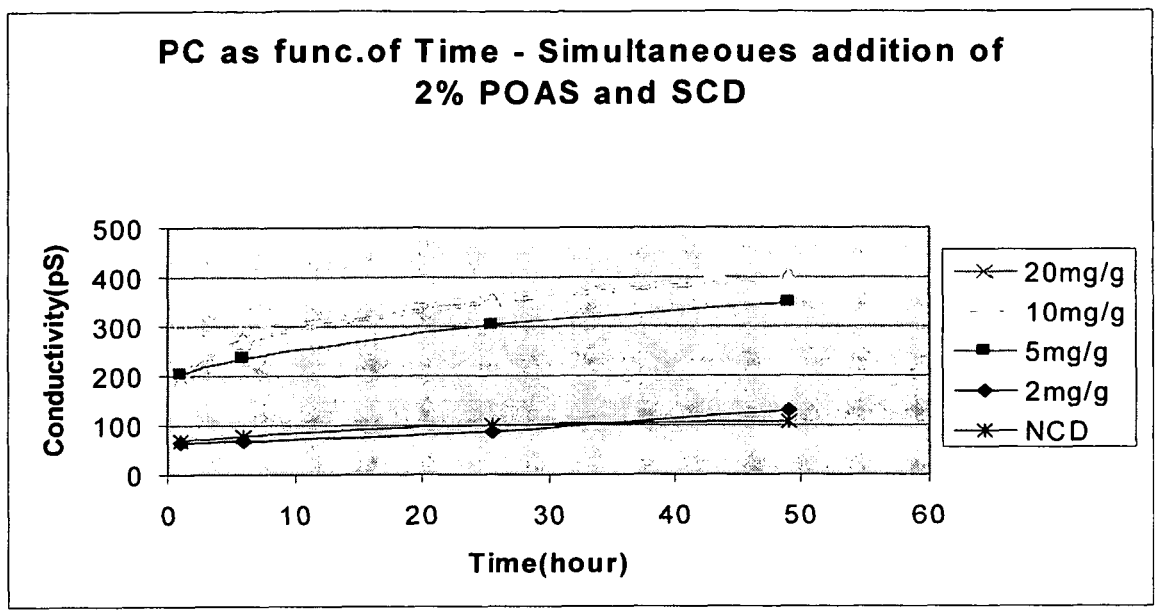
Figure 4C:
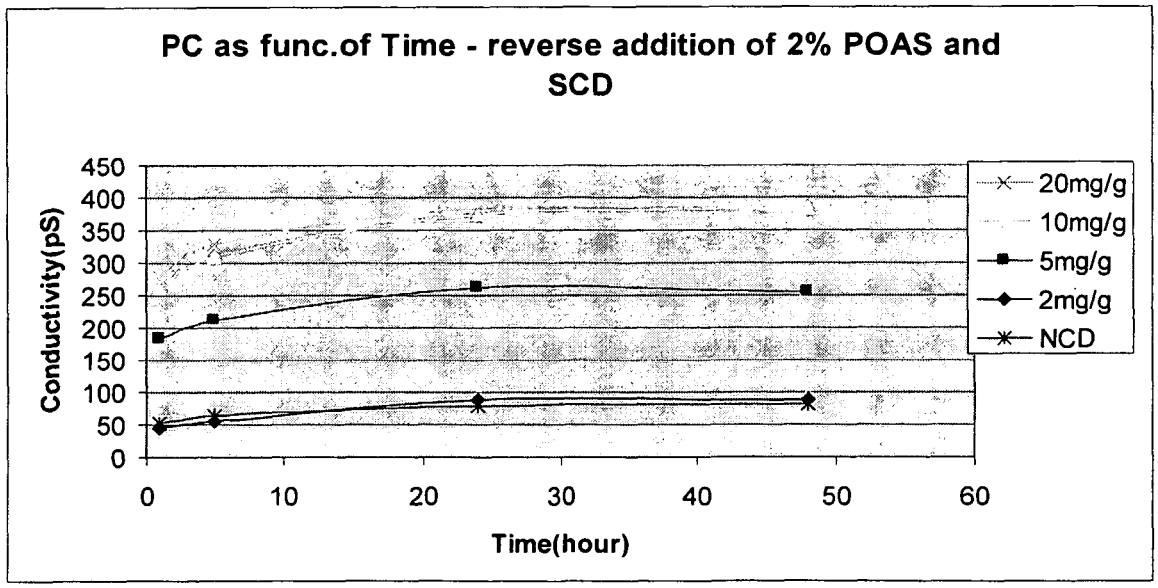
Figure 4D:
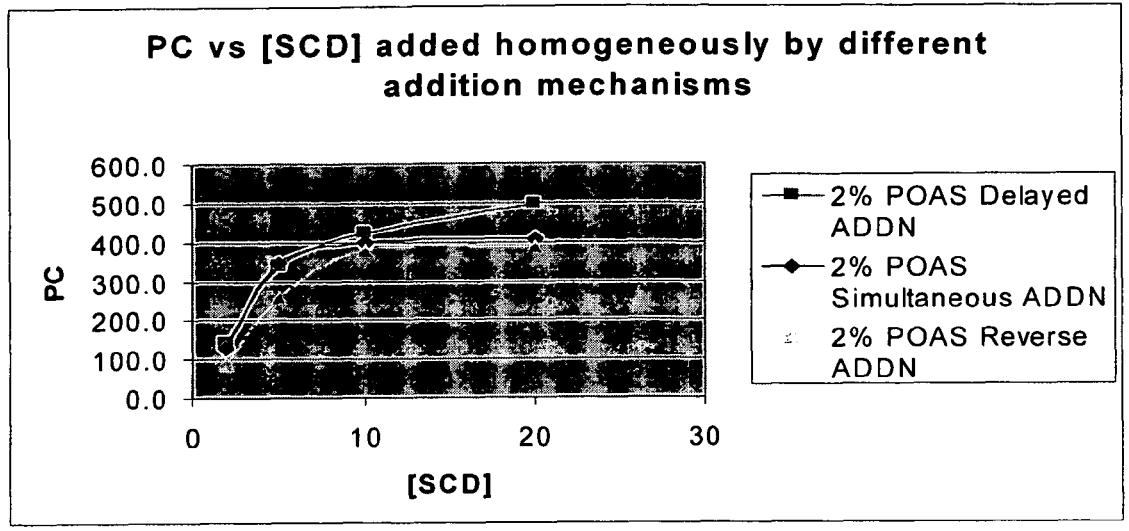

In the second part, ink without charge adjuvant was charged with SCD at 2, 5, 10, 20 mg/g, and NCD 40 mg/g solids to 70 pS.
Results:
A_1 Charging Profile of POAS Inks vs. VCA Inks The charged samples of ink were tested for low field conductivity (LFC), high field conductivity (HFC), and dc conductivity (dc). Particle conductivity (PC) through time was calculated. Measurement data are summarized below in tables and FIGS. 1A and 2K:

TABLE A_1-1

| 2% VCA | Time = 1.25 h | Sample | HFC(pS) | dc(pS) | LFC(pS) | PC(pS) |
|---|---|---|---|---|---|---|
| | | 2 | 191 | 1 | 11 | 180 |
| | | 5 | 268 | 2 | 16 | 252 |
| | | 10 | 332 | 3 | 27 | 305 |
| | | 20 | 375 | 4 | 54 | 321 |
| | | NCD | 198 | 8 | 73 | 125 |

TABLE A_1-2

| 2% VCA | Time = 6 h | Sample | HFC(pS) | dc(pS) | LFC(pS) | PC(pS) |
|---|---|---|---|---|---|---|
| | | 2 | 220 | 1 | 11 | 209 |
| | | 5 | 310 | 2 | 16 | 294 |
| | | 10 | 375 | 3 | 29 | 346 |
| | | 20 | 406 | 4 | 54 | 352 |
| | | NCD | 165 | 6 | 63 | 102 |

TABLE A_1-3

| 2% VCA | Time = 24 h | Sample | HFC(pS) | dc(pS) | LFC | PC |
|---|---|---|---|---|---|---|
| | | 2 | 214 | 1 | 10 | 204 |
| | | 5 | 326 | 2 | 14 | 312 |
| | | 10 | 396 | 3 | 24 | 372 |
| | | 20 | 437 | 5 | 49 | 388 |
| | | NCD | 200 | 8 | 52 | 148 |

TABLE A_1-4

| 2% VCA | Time = 48.5 h | Sample | HFC(pS) | dc(pS) | LFC(pS) | PC(pS) |
|---|---|---|---|---|---|---|
| | | 2 | 184 | 1 | 9 | 175 |
| | | 5 | 300 | 2 | 13 | 287 |
| | | 10 | 360 | 3 | 24 | 336 |
| | | 20 | 395 | 5 | 51 | 344 |
| | | NCD | 195 | 8 | 50 | 145 |

TABLE A_1-5

| 2% POAS | Time = 1 h | Sample | HFC(pS) | dc(pS) | LFC(pS) | PC(pS) |
|---|---|---|---|---|---|---|
| | | 2 | 165 | 0 | 10 | 155 |
| | | 5 | 249 | 1 | 17 | 232 |
| | | 10 | 297 | 2 | 31 | 266 |
| | | 20 | 328 | 4 | 65 | 263 |
| | | NCD | 165 | 6 | 76 | 89 |

TABLE A_1-6

| 2% POAS | Time = 6 h | Sample | HFC(pS) | dc(pS) | LFC(pS) | PC(pS) |
|---|---|---|---|---|---|---|
| | | 2 | 188 | 1 | 11 | 177 |
| | | 5 | 290 | 1 | 16 | 274 |
| | | 10 | 340 | 2 | 31 | 309 |
| | | 20 | 367 | 4 | 62 | 305 |
| | | NCD | 202 | 8 | 47 | 155 |

TABLE A_1-7

| 2% POAS | Time = 24 h | Sample | HFC(pS) | dc(pS) | LFC(pS) | PC(pS) |
|---|---|---|---|---|---|---|
| | | 2 | 189 | 1 | 9 | 180 |
| | | 5 | 315 | 1 | 14 | 301 |
| | | 10 | 364 | 3 | 25 | 339 |
| | | 20 | 418 | 5 | 52 | 366 |
| | | NCD | 169 | 6 | 50 | 119 |

TABLE A_1-8

| 2% POAS | Time = 48.5 h | Sample | HFC(pS) | dc(pS) | LFC(pS) | PC(pS) |
|---|---|---|---|---|---|---|
| | | 2 | 167 | 1 | 9 | 158 |
| | | 5 | 288 | 1 | 14 | 274 |
| | | 10 | 351 | 2 | 25 | 326 |
| | | 20 | 381 | 4 | 50 | 331 |
| | | NCD | 166 | 5 | 48 | 118 |

TABLE A_1-9

| 1% VCA | Time = 1 h | Sample | HFC(pS) | dc(pS) | LFC(pS) | PC(pS) |
|---|---|---|---|---|---|---|
| | | 2 | 175 | 1 | 9 | 166 |
| | | 5 | 259 | 1 | 17 | 242 |
| | | 10 | 311 | 2 | 31 | 280 |
| | | 20 | 343 | 4 | 62 | 281 |
| | | NCD | 167 | 5 | 75 | 92 |

TABLE A_1-10

| 1% VCA | Time = 6 h | Sample | HFC(pS) | dc(pS) | LFC(pS) | PC(pS) |
|---|---|---|---|---|---|---|
| | | 2 | 182 | 1 | 10 | 172 |
| | | 5 | 283 | 2 | 17 | 266 |
| | | 10 | 332 | 3 | 30 | 302 |
| | | 20 | 367 | 5 | 58 | 309 |
| | | NCD | 163 | 5 | 66 | 97 |

TABLE A_1-11

| 1% VCA | Time = 24 h | Sample | HFC(pS) | dc(pS) | LFC(pS) | PC(pS) |
|---|---|---|---|---|---|---|
| | | 2 | 149 | 1 | 8 | 141 |
| | | 5 | 260 | 2 | 13 | 247 |
| | | 10 | 315 | 3 | 25 | 290 |
| | | 20 | 366 | 5 | 50 | 316 |
| | | NCD | 149 | 5 | 54 | 96 |

TABLE A_1-12

| 1% VCA | Time = 49.5 h | Sample | HFC(pS) | dc(pS) | LFC(pS) | PC(pS) |
|---|---|---|---|---|---|---|
| | | 2 | 130 | 1 | 7 | 123 |
| | | 5 | 259 | 1 | 12 | 247 |
| | | 10 | 316 | 3 | 23 | 293 |
| | | 20 | 356 | 4 | 46 | 310 |
| | | NCD | 152 | 5 | 52 | 100 |

TABLE A_1-13

| 1% POAS | Time = 1 h | Sample | HFC(pS) | dc(pS) | LFC(pS) | PC(pS) |
|---|---|---|---|---|---|---|
| | | 2 | 150 | 1 | 9 | 141 |
| | | 5 | 232 | 1 | 16 | 216 |
| | | 10 | 286 | 2 | 32 | 254 |
| | | 20 | 328 | 4 | 69 | 259 |
| | | NCD | 137 | 4 | 79 | 58 |

TABLE A_1-14

| 1% POAS | Time = 6 h | Sample | HFC(pS) | dc(pS) | LFC(pS) | PC(pS) |
|---|---|---|---|---|---|---|
| | | 2 | 151 | 1 | 9 | 142 |
| | | 5 | 248 | 1 | 16 | 232 |
| | | 10 | 303 | 2 | 33 | 270 |
| | | 20 | 356 | 4 | 66 | 290 |
| | | NCD | 133 | 4 | 67 | 66 |

TABLE A_1-15

| 1% POAS | Time = 24 h | Sample | HFC(pS) | dc(pS) | LFC(pS) | PC(pS) |
|---|---|---|---|---|---|---|
| | | 2 | 120 | 0 | 7 | 113 |
| | | 5 | 227 | 1 | 13 | 214 |
| | | 10 | 293 | 2 | 25 | 268 |
| | | 20 | 342 | 4 | 51 | 291 |
| | | NCD | 119 | 4 | 58 | 61 |

TABLE A_1-16

| 1% POAS | Time = 49.5 h | Sample | HFC(pS) | dc(pS) | LFC(pS) | PC(pS) |
|---|---|---|---|---|---|---|
| | | 2 | 109 | 0 | 6 | 103 |
| | | 5 | 226 | 1 | 12 | 214 |
| | | 10 | 302 | 2 | 23 | 279 |
| | | 20 | 340 | 4 | 56 | 284 |
| | | NCD | 118 | 4 | 58 | 60 |

TABLE A_1-17

| 4% VCA | Time = 1.25 h | Sample | HFC(pS) | dc(pS) | LFC(pS) | PC(pS) |
|---|---|---|---|---|---|---|
| | | 2 | 225 | 1 | 10 | 215 |
| | | 5 | 325 | 2 | 15 | 310 |
| | | 10 | 396 | 4 | 26 | 370 |
| | | 20 | 422 | 6 | 50 | 372 |
| | | NCD | 252 | 10 | 70 | 182 |

TABLE A_1-18

| 4% VCA | Time = 6.25 h | Sample | HFC(pS) | dc(pS) | LFC(pS) | PC(pS) |
|---|---|---|---|---|---|---|
| | | 2 | 210 | 1 | 11 | 199 |
| | | 5 | 317 | 2 | 14 | 303 |
| | | 19 | 397 | 4 | 22 | 375 |
| | | 20 | 424 | 6 | 35 | 389 |
| | | NCD | 248 | 10 | 55 | 193 |

TABLE A_1-19

| 4% VCA | Time = 24.25 h | Sample | HFC(pS) | dc(pS) | LFC(pS) | PC(pS) |
|---|---|---|---|---|---|---|
| | | 2 | 202 | 1 | 9 | 193 |
| | | 5 | 335 | 2 | 13 | 322 |
| | | 10 | 398 | 3 | 21 | 377 |
| | | 20 | 439 | 6 | 35 | 404 |
| | | NCD | 233 | 9 | 49 | 198 |

TABLE A_1-20

| 4% VCA | Time = 46.5 | Sample | HFC(pS) | dc(pS) | LFC(pS) | PC(pS) |
|---|---|---|---|---|---|---|
| | | 2 | 168 | 1 | 8 | 160 |
| | | 5 | 307 | 2 | 12 | 295 |
| | | 10 | 399 | 4 | 20 | 379 |
| | | 20 | 439 | 7 | 38 | 401 |
| | | NCD | 247 | 9 | 49 | 198 |

TABLE A_1-21

| 4% POAS | Time = 1.25 h | Sample | HFC(pS) | dc(pS) | LFC(pS) | PC(pS) |
|---|---|---|---|---|---|---|
| | | 2 | 186 | 1 | 10 | 176 |
| | | 5 | 304 | 2 | 16 | 288 |
| | | 10 | 345 | 3 | 29 | 316 |
| | | 20 | 391 | 5 | 58 | 333 |
| | | NCD | 237 | 8 | 71 | 166 |

TABLE A_1-22

| 4% POAS | Time = 6.25 h | Sample | HFC(pS) | dc(pS) | LFC(pS) | PC(pS) |
|---|---|---|---|---|---|---|
| | | 2 | 203 | 1 | 10 | 193 |
| | | 5 | 315 | 2 | 15 | 300 |
| | | 10 | 378 | 3 | 26 | 352 |
| | | 20 | 423 | 5 | 52 | 371 |
| | | NCD | 238 | 8 | 65 | 173 |

TABLE A_1-23

| 4% POAS | Time = 24.25 h | Sample | HFC(pS) | dc(pS) | LFC(pS) | PC(pS) |
|---|---|---|---|---|---|---|
| | | 2 | 198 | 1 | 9 | 189 |
| | | 5 | 333 | 3 | 13 | 320 |
| | | 10 | 392 | 5 | 22 | 370 |
| | | 20 | 473 | 8 | 97 | 377 |
| | | NCD | 254 | 10 | 48 | 206 |

TABLE A_1-24

| 4% POAS | Time = 46.5 h | Sample | HFC(pS) | dc(pS) | LFC(pS) | PC(pS) |
|---|---|---|---|---|---|---|
| | | 2 | 201 | 1 | 9 | 192 |
| | | 5 | 348 | 2 | 12 | 336 |
| | | 10 | 421 | 3 | 20 | 401 |
| | | 20 | 453 | 6 | 40 | 413 |
| | | NCD | 238 | 8 | 52 | 186 |

Long term measurements of a week after charging were conducted in order to determine the final electrical characteristics of the system. The table below summarizes the data of these measurements for the 6 Cyan inks for their different amounts of VCA and POAS. The PC of NCD samples is much smaller than that of SCD samples at long term. The trend observed for PC is also observed in the viscosity measurements where the viscosity difference between POAS and VCA increases. The particle size is about the same, although there is a slightly higher particle size in POAS as compared to VCA ink.

TABLE A_1-8

| PC(Ps) | LF(pS) | dc(pS) | HF(pS) | POAS | PC(pS) | LF(pS) | dc(pS) | HF(pS) | VCA | SCD(mg/g) |
|---|---|---|---|---|---|---|---|---|---|---|
| 110 | 6 | 4 | 116 | 1% | 144 | 7 | 5 | 151 | 1% | 2 |
| 221 | 12 | 1 | 233 | | 236 | 12 | 1 | 248 | | 5 |
| 288 | 25 | 2 | 313 | | 316 | 23 | 2 | 339 | | 10 |
| 332 | 53 | 4 | 385 | | 362 | 48 | 5 | 410 | | 20 |
| 58 | 54 | 4 | 112 | | 92 | 53 | 5 | 145 | | NCD |
| 134 | 8 | 1 | 142 | 2% | 127 | 8 | 1 | 135 | 2% | 2 |
| 251 | 13 | 1 | 264 | | 260 | 13 | 2 | 273 | | 5 |
| 331 | 23 | 3 | 354 | | 332 | 22 | 3 | 354 | | 10 |
| 355 | 44 | 5 | 399 | | 373 | 38 | 5 | 411 | | 20 |
| 120 | 55 | 5 | 175 | | 125 | 73 | 8 | 198 | | NCD |
| 210 | 9 | 1 | 219 | 4% | 148 | 8 | 1 | 156 | 4% | 2 |
| 391 | 12 | 2 | 403 | | 322 | 12 | 2 | 334 | | 5 |
| 463 | 22 | 4 | 485 | | 426 | 17 | 4 | 443 | | 10 |
| 463 | 46 | 7 | 509 | | 465 | 39 | 7 | 504 | | 20 |
| 199 | 55 | 8 | 254 | | 213 | 52 | 9 | 265 | | NCD |

EXAMPLE 2

POAS Homogeneous Addition

In this example POAS is added homogeneously to ink prepared without charge adjuvant is compared to VCA is added to ink during grinding.

The charging level was obtained by measuring HFC, dc, and LFC and the related particle conductivity of ink particles. The data of this charging is detailed in tables and FIGS. 3A-3D.

TABLE A_2-1

| SCD charging without CA | Time = 1 h | Sample | HFC(pS) | dc(pS) | LFC(pS) | PC(pS) |
|---|---|---|---|---|---|---|
| | | 2 | 84 | 0 | 7 | 77 |
| | | 5 | 145 | 1 | 15 | 130 |
| | | 10 | 192 | 1 | 31 | 161 |
| | | 20 | 230 | 2 | 66 | 164 |
| | | NCD | 84 | 3 | 79 | 5 |

TABLE A_2-2

| SCD charging without CA | Time = 6 h | Sample | HFC(pS) | dc(pS) | LFC(pS) | PC(pS) |
|---|---|---|---|---|---|---|
| | | 2 | 68 | 0 | 7 | 61 |
| | | 5 | 145 | 1 | 14 | 131 |
| | | 10 | 196 | 1 | 28 | 168 |
| | | 20 | 237 | 2 | 58 | 179 |
| | | NCD | 83 | 3 | 70 | 13 |

TABLE A_2-3

| SCD charging without CA | Time = 25.5 h | Sample | HFC(pS) | dc(pS) | LFC(pS) | PC(pS) |
|---|---|---|---|---|---|---|
| | | 2 | 52 | 0 | 6 | 46 |
| | | 5 | 145 | 1 | 14 | 131 |
| | | 10 | 200 | 1 | 27 | 173 |
| | | 20 | 254 | 2 | 55 | 199 |
| | | NCD | 70 | 2 | 58 | 12 |

TABLE A_2-4

| SCD charging without CA | Time = 49 h | Sample | HFC(pS) | dc(pS) | LFC(pS) | PC(pS) |
|---|---|---|---|---|---|---|
| | | 2 | 664 | 0 | 6 | 58 |
| | | 5 | 164 | 1 | 13 | 151 |
| | | 10 | 226 | 1 | 25 | 201 |
| | | 20 | 265 | 2 | 52 | 213 |
| | | NCD | 81 | 2 | 52 | 29 |

EXAMPLE 3

Alternative Addition Mechanisms for POAS

In addition to normal addition, alternatively different addition ways were preformed:

Simultaneous addition: Simultaneous addition of 2% POAS and SCD at 2, 5, 10, 20 mg/g and NCD 40 mg/g solids for having a LF of 70 pS was done. Reverse addition: Ink was charged with charged SCD at 2, 5, 10, 20 mg/g and NCD 40 mg/g solids for having 70 pS and incubated for a day. This was followed by the addition of 2% POAS. The result are summerised in FIGS. 4A-4D.

TABLE C_3-1

| Simultaneous addition of 2% POAS and SCD | Time = 1 h | Sample | HFC(pS) | dc(pS) | LFC(pS) | PC(pS) |
|---|---|---|---|---|---|---|
| | | 2 | 95 | 0 | 29 | 66 |
| | | 5 | 259 | 1 | 57 | 202 |
| | | 10 | 332 | 3 | 143 | 189 |
| | | 20 | 357 | 5 | 66 | 291 |
| | | NCD | 157 | 4 | 89 | 68 |

TABLE C_3-2

| Simultaneous addition of 2% POAS and SCD | Time = 6 h | Sample | HFC(pS) | dc(pS) | LFC(pS) | PC(pS) |
|---|---|---|---|---|---|---|
| | | 2 | 81 | 0 | 12 | 69 |
| | | 5 | 267 | 1 | 32 | 235 |
| | | 10 | 347 | 3 | 75 | 272 |
| | | 20 | 398 | 5 | 103 | 295 |
| | | NCD | 156 | 4 | 78 | 78 |

TABLE C_3-3

| Simultaneous addition of 2% POAS and SCD | Time = 25.5 h | Sample | HFC(pS) | dc(pS) | LFC(pS) | PC(pS) |
|---|---|---|---|---|---|---|
| | | 2 | 99 | 0 | 10 | 89 |
| | | 5 | 326 | 1 | 21 | 305 |
| | | 10 | 410 | 3 | 58 | 352 |
| | | 20 | 445 | 4 | 81 | 364 |
| | | NCD | 168 | 3 | 67 | 101 |

TABLE C_3-4

| Simultaneous addition of 2% POAS and SCD | Time = 49 h | Sample | HFC(pS) | dc(pS) | LFC(pS) | PC(pS) |
|---|---|---|---|---|---|---|
| | | 2 | 137 | 0 | 9 | 128 |
| | | 5 | 366 | 2 | 18 | 348 |
| | | 10 | 453 | 3 | 53 | 400 |
| | | 20 | 471 | 5 | 71 | 409 |
| | | NCD | 165 | 2 | 59 | 106 |

PC results of reverse addition of POAS and SCD

TABLE C_3-5

| Reverse addition of POAS and SCD | Time = 1 h | Sample | HFC(pS) | dc(pS) | LFC(pS) | PC(pS) |
|---|---|---|---|---|---|---|
| | | 2 | 54 | 0 | 10 | 44 |
| | | 5 | 209 | 1 | 25 | 184 |
| | | 10 | 316 | 2 | 54 | 262 |
| | | 20 | 374 | 4 | 95 | 279 |
| | | NCD | 114 | 3 | 62 | 52 |

TABLE C_3-6

| Reverse addition of POAS and SCD | Time = 5 h | Sample | HFC(pS) | dc(pS) | LFC(pS) | PC(pS) |
|---|---|---|---|---|---|---|
| | | 2 | 64 | 0 | 8 | 56 |
| | | 5 | 230 | 1 | 18 | 212 |
| | | 10 | 351 | 2 | 41 | 310 |

TABLE C_3-6-continued

| Reverse addition of POAS and SCD | Time = 5 h | Sample | HFC (pS) | dc (pS) | LFC (pS) | PC (pS) |
|---|---|---|---|---|---|---|
| | | 20 | 410 | 4 | 82 | 328 |
| | | NCD | 123 | 3 | 60 | 63 |

TABLE C_3-7

| Reverse addition of POAS and SCD | Time = 24 h | Sample | HFC (pS) | dc (pS) | LFC (pS) | PC (pS) |
|---|---|---|---|---|---|---|
| | | 2 | 96 | 0 | 8 | 88 |
| | | 5 | 277 | 1 | 14 | 263 |
| | | 10 | 407 | 3 | 32 | 375 |
| | | 20 | 452 | 5 | 69 | 383 |
| | | NCD | 140 | 3 | 61 | 79 |

TABLE C_3-8

| Reverse addition of POAS and SCD | Time = 48 h | Sample | HFC (pS) | dc (pS) | LFC (pS) | PC (pS) |
|---|---|---|---|---|---|---|
| | | 2 | 96 | 0 | 8 | 88 |
| | | 5 | 268 | 1 | 12 | 256 |
| | | 10 | 413 | 3 | 29 | 384 |
| | | 20 | 433 | 5 | 60 | 373 |
| | | NCD | 138 | 3 | 58 | 80 |

EXAMPLE 4

Second Addition of POAS

Figure 5:
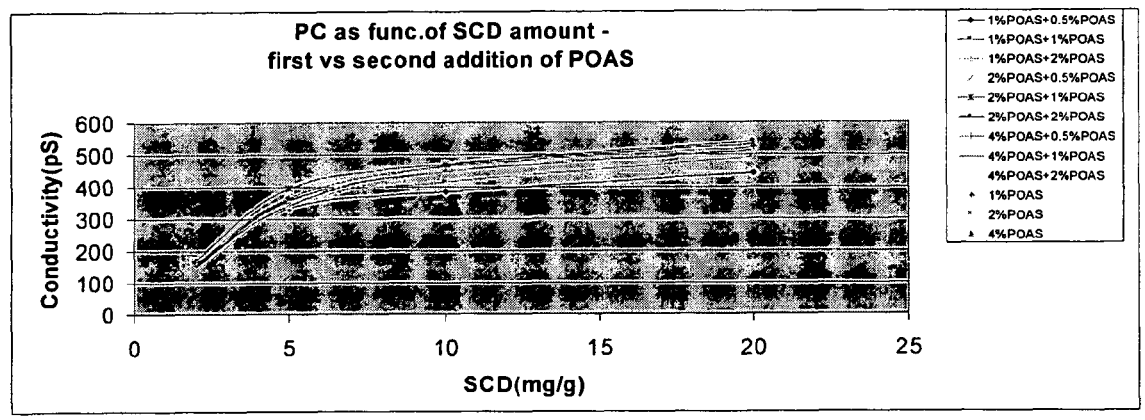
FIG. 5 illustrates a graph of the multi-step charging of embodiments of the charging ink at differing levels of POAS added post grinding as a function of time and at different charge director concentrations using different addition methods. In this embodiment, the charging ink was charged to three initial concentrations and then the charging ink was charged to a second concentration.

Ink was prepared without charge adjuvant. To this ink POAS was added in a relative amount of 1%, 2%, 4%. These inks were charged with SCD in the amounts of 2, 5, 10, 20 mg/g solids and NCD to a LF of 70 pS. The inks were tested for PC (FIG. 5). In the second part a second addition of POAS of 0.5%, 1%, 2% was added to the inks in part 1. In total 12 inks were prepared Cyan 5.0 with 1% POAS.
Cyan 5.0 with 2% POAS.
Cyan 5.0 with 4% POAS
Cyan 5.0 with 1% POAS+0.5% of POAS.
Cyan 5.0 with 1% POAS+1% of POAS.
Cyan 5.0 with 1% POAS+2% of POAS.
Cyan 5.0 with 2% POAS+0.5% of POAS.
Cyan 5.0 with 2% POAS+1% of POAS.
Cyan 5.0 with 2% POAS+2% of POAS.
Cyan 5.0 with 4% POAS+0.5% of POAS.
Cyan 5.0 with 4% POAS+1% of POAS.
Cyan 5.0 with 4% POAS+2% of POAS.

TABLE C_1-1

| Addition of 1% POAS | Time = 1 h | Sample | HFC(pS) | dc(pS) | LFC (pS) | PC (pS) |
|---|---|---|---|---|---|---|
| | | 2 | 138 | 0 | 8 | 130 |
| | | 5 | 256 | 1 | 14 | 242 |
| | | 10 | 335 | 2 | 29 | 306 |
| | | 20 | 393 | 3 | 67 | 326 |
| | | NCD | 154 | 3 | 79 | 75 |

TABLE C_1-2

| Addition of 1% POAS | Time = 6 h | Sample | HFC(pS) | dc(pS) | LFC (pS) | PC (pS) |
|---|---|---|---|---|---|---|
| | | 2 | 151 | 0 | 8 | 143 |
| | | 5 | 273 | 1 | 14 | 259 |
| | | 10 | 369 | 2 | 27 | 342 |
| | | 20 | 425 | 4 | 59 | 366 |
| | | NCD | 163 | 3 | 74 | 89 |

TABLE C_1-3

| Addition of 1% POAS | Time = 24 h | Sample | HFC(pS) | dc(pS) | LFC (pS) | PC (pS) |
|---|---|---|---|---|---|---|
| | | 2 | 134 | 0 | 8 | 126 |
| | | 5 | 269 | 1 | 14 | 255 |
| | | 10 | 361 | 2 | 23 | 338 |
| | | 20 | 424 | 3 | 44 | 380 |
| | | NCD | 152 | 2 | 57 | 95 |

TABLE C_1-4

| Addition of 1% POAS | Time = 48 h | Sample | HFC(pS) | dc(pS) | LFC (pS) | PC (pS) |
|---|---|---|---|---|---|---|
| | | 2 | 132 | 0 | 8 | 124 |
| | | 5 | 289 | 1 | 13 | 276 |
| | | 10 | 375 | 2 | 23 | 352 |
| | | 20 | 414 | 4 | 50 | 364 |
| | | NCD | 148 | 3 | 54 | 94 |

TABLE C_1-5

| Addition of 2% POAS | Time = 1 h | Sample | HFC(pS) | dc(pS) | LFC (pS) | PC (pS) |
|---|---|---|---|---|---|---|
| | | 2 | 160 | 0 | 8 | 152 |
| | | 5 | 340 | 2 | 13 | 327 |
| | | 10 | 396 | 2 | 26 | 370 |
| | | 20 | 469 | 5 | 60 | 409 |
| | | NCD | 203 | 3 | 79 | 124 |

TABLE C_1-6

| Addition of 2% POAS | Time = 6 h | Sample | HFC(pS) | dc(pS) | LFC (pS) | PC (pS) |
|---|---|---|---|---|---|---|
| | | 2 | 166 | 0 | 9 | 157 |
| | | 5 | 326 | 1 | 13 | 313 |
| | | 10 | 423 | 3 | 24 | 399 |
| | | 20 | 499 | 5 | 54 | 445 |
| | | NCD | 206 | 3 | 75 | 131 |

TABLE C_1-7

| Addition of 2% POAS | Time = 24 h | Sample | HFC(pS) | dc(pS) | LFC (pS) | PC (pS) |
|---|---|---|---|---|---|---|
| | | 2 | 143 | 0 | 8 | 135 |
| | | 5 | 333 | 1 | 12 | 321 |
| | | 10 | 433 | 2 | 22 | 411 |
| | | 20 | 509 | 5 | 46 | 470 |
| | | NCD | 202 | 3 | 61 | 144 |

TABLE C_1-8

Addition of 2% POAS, Time = 48 h

| Sample | HFC(pS) | dc(pS) | LFC(pS) | PC(pS) |
|---|---|---|---|---|
| 2 | 152 | 0 | 8 | 144 |
| 5 | 348 | 1 | 12 | 336 |
| 10 | 446 | 3 | 22 | 424 |
| 20 | 495 | 5 | 46 | 449 |
| NCD | 198 | 3 | 61 | 137 |

TABLE C_1-9

Addition of 4% POAS, Time = 1 h

| Sample | HFC(pS) | dc(pS) | LFC(pS) | PC(pS) |
|---|---|---|---|---|
| 2 | 189 | 1 | 9 | 180 |
| 5 | 339 | 2 | 14 | 325 |
| 10 | 436 | 3 | 26 | 410 |
| 20 | 515 | 6 | 58 | 457 |
| NCD | 232 | 4 | 81 | 151 |

TABLE C_1-10

Addition of 4% POAS, Time = 6 h

| Sample | HFC(pS) | dc(pS) | LFC(pS) | PC(pS) |
|---|---|---|---|---|
| 2 | 180 | 0 | 10 | 170 |
| 5 | 357 | 2 | 16 | 341 |
| 10 | 461 | 3 | 27 | 434 |
| 20 | 539 | 6 | 57 | 482 |
| NCD | 230 | 4 | 76 | 154 |

TABLE C_1-11

Addition of 4% POAS, Time = 24 h

| Sample | HFC(pS) | dc(pS) | LFC(pS) | PC(pS) |
|---|---|---|---|---|
| 2 | 150 | 0 | 9 | 141 |
| 5 | 358 | 2 | 15 | 343 |
| 10 | 466 | 3 | 25 | 441 |
| 20 | 547 | 6 | 46 | 501 |
| NCD | 231 | 4 | 55 | 176 |

TABLE C_1-12

Addition of 4% POAS, Time = 48 h

| Sample | HFC(pS) | dc(pS) | LFC(pS) | PC(pS) |
|---|---|---|---|---|
| 2 | 152 | 0 | 9 | 143 |
| 5 | 367 | 2 | 15 | 352 |
| 10 | 483 | 4 | 26 | 457 |
| 20 | 542 | 6 | 48 | 494 |
| NCD | 225 | 3 | 63 | 162 |

C_2. Second Addition

TABLE C_2-1

C 5.0 1% POAS + 0.5% POAS

| PC(pS) | LFC(pS) | dc(pS) | HFC(pS) | Sample |
|---|---|---|---|---|
| 158 | 8 | 0 | 166 | 2 |
| 336 | 12 | 1 | 348 | 5 |
| 383 | 19 | 2 | 402 | 10 |
| 442 | 41 | 5 | 483 | 20 |
| 15 | 8 | 0 | 23 | NCD |

TABLE C_2-2

C 5.0 1% POAS + 1% POAS

| PC(pS) | LFC(pS) | dc(pS) | HFC(pS) | Sample |
|---|---|---|---|---|
| 147 | 7 | 0 | 154 | 2 |
| 360 | 12 | 2 | 372 | 5 |
| 414 | 19 | 3 | 433 | 10 |
| 490 | 41 | 6 | 531 | 20 |
| 40 | 9 | 0 | 49 | NCD |

TABLE C_2-3

C 5.0 1% POAS + 2% POAS

| PC(pS) | LFC(pS) | dc(pS) | HFC(pS) | Sample |
|---|---|---|---|---|
| 167 | 7 | 1 | 174 | 2 |
| 342 | 10 | 2 | 352 | 5 |
| 450 | 19 | 3 | 469 | 10 |
| 520 | 44 | 7 | 564 | 20 |
| 31 | 8 | 0 | 39 | NCD |

TABLE C_2-4

C 5.0 2% POAS + 0.5% POAS

| PC(pS) | LFC(pS) | dc(pS) | HFC(pS) | Sample |
|---|---|---|---|---|
| 170 | 8 | 1 | 178 | 2 |
| 352 | 10 | 2 | 362 | 5 |
| 459 | 20 | 4 | 479 | 10 |
| 513 | 41 | 6 | 554 | 20 |
| 35 | 8 | 0 | 43 | NCD |

TABLE C_2-5

C 5.0 2% POAS + 1% POAS

| PC(pS) | LFC(pS) | dc(pS) | HFC(pS) | Sample |
|---|---|---|---|---|
| 170 | 7 | 1 | 177 | 2 |
| 395 | 12 | 2 | 407 | 5 |
| 470 | 19 | 4 | 489 | 10 |
| 531 | 41 | 7 | 572 | 20 |
| 31 | 8 | 0 | 39 | NCD |

TABLE C_2-6

C 5.0 2% POAS + 2% POAS

| PC(pS) | LFC(pS) | dc(pS) | HFC(pS) | Sample |
|---|---|---|---|---|
| 162 | 8 | 1 | 170 | 2 |
| 341 | 11 | 2 | 352 | 5 |
| 465 | 19 | 4 | 484 | 10 |
| 539 | 41 | 7 | 580 | 20 |
| 39 | 9 | 0 | 48 | NCD |

TABLE C_2-7

C 5.0 4% POAS + 0.5% POAS

| PC(pS) | LFC(pS) | dc(pS) | HFC(pS) | Sample |
|---|---|---|---|---|
| 160 | 8 | 1 | 168 | 2 |
| 365 | 11 | 2 | 376 | 5 |
| 463 | 17 | 4 | 480 | 10 |
| 520 | 41 | 7 | 561 | 20 |
| 29 | 9 | 0 | 38 | NCD |

TABLE C_2-8

| PC (pS) | LFC (pS) | dc(pS) | HFC(pS) | Sample | Sample C 5.0 4% POAS + 1% POAS |
|---|---|---|---|---|---|
| 151 | 8 | 0 | 159 | 2 | |
| 359 | 14 | 2 | 373 | 5 | |
| 447 | 20 | 4 | 467 | 10 | |
| 512 | 38 | 7 | 550 | 20 | |
| 17 | 8 | 0 | | 25 | NCD |

TABLE C_2-9

| PC (pS) | LFC(pS) | dc(pS) | HFC(pS) | Sample | C 5.0 4% POAS + 2% POAS |
|---|---|---|---|---|---|
| 140 | 11 | 1 | 151 | 2 | |
| 334 | 20 | 2 | 354 | 5 | |
| 447 | 31 | 5 | 478 | 10 | |
| 518 | 44 | 7 | 562 | 20 | |
| 23 | 9 | 0 | | 32 | NCD |

EXAMPLE 5

Figure 6:
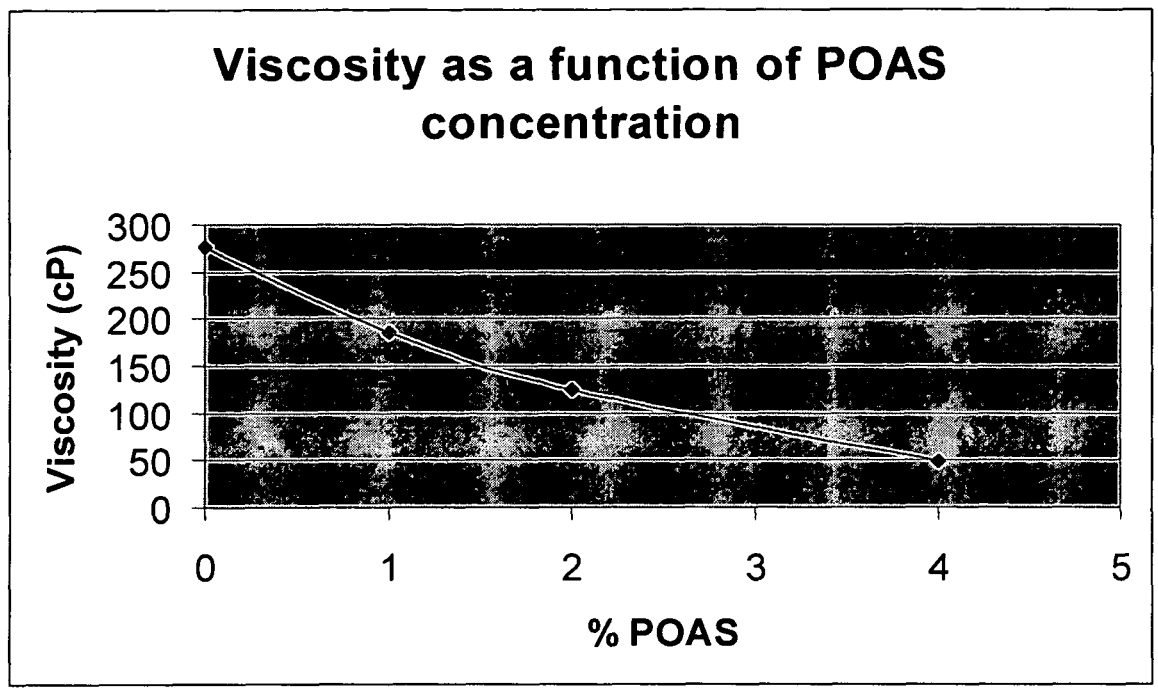
FIG. 6 illustrates a graph of the change in viscosity of embodiments of the charging ink as a function of the amount of POAS added to ink prepared with charge adjuvant.

Other physical properties such as viscosity and particle size were also measured. The reduction of viscosity as a function of POAS concentration did not produce a noticeable change in PS and possible change in particle morphology. The results and are given in the table below and FIG. 6.

TABLE C_1-13

| Particle size(μm) | Viscosity(cPoise) | Sample |
|---|---|---|
| 7.077 | 275.6 | Cyan 5.0(no CA) |
| 7.511 | 185.1 | Cyan 5.0(no CA) + 1% POAS |
| 6.509 | 125.1 | Cyan 5.0(no CA) + 2% POAS |
| 7.159 | 49.5 | Cyan 5.0(no CA) + 4% POAS |

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range.

Many variations and modifications may be made to the above-described embodiments. All such modifications and variations are intended to be included herein within the scope of this disclosure and protected by the following claims.

At least the following is claimed:

1. A method of making an ink toner, comprising:
grinding a carrier liquid, a resin, and a pigment, to form a slurry; and
mixing a charge adjuvant and a charge director with the ink slurry after grinding, wherein the charge adjuvant is a polymeric organometallic compound, and wherein the ink toner does not include aluminum stearate.

2. The method of claim 1, wherein mixing includes: mixing the charge adjuvant with the slurry homogeneously prior to mixing the charge director with the slurry.

3. The method of claim 2, further comprising mixing a second amount of the charge adjuvant with the slurry.

4. The method of claim 1, wherein mixing includes: mixing the charge adjuvant and the charge director with the slurry simultaneously.

5. The method of claim 4, further comprising mixing a second amount of the charge adjuvant with the slurry.

6. The method of claim 1, mixing the charge director with the slurry homogeneously prior to mixing the charge adjuvant with the slurry.

7. The method of claim 6, further comprising mixing a second amount of the charge adjuvant with the slurry.

8. The method of claim 1, wherein the polymeric organometallic compound is a compound having a formula selected from: formula I, formula II, and formula III:

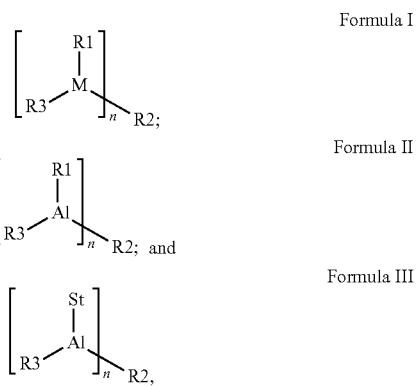

where M is a metal selected from: Al, Ba, Na, Mg, Zn, Ca, Zr, Co, Cu, Fe, Ga, B, Si, In, and Sn; R1 is selected from: stearate palmitate, arachidate, deprotonated unsaturated fatty acids, deprotonated polyunsatureted fatty acids, linear alkyl groups, branched alkyl groups, aromatics, heteroaromatrics, and cyclic alkyl groups; R2 is selected from: hydrogen, OH, and an R1 group; R3 is selected from: a hydroxide, an ester, a sulfonate, a stearate, an acetate, and an R1 group; and wherein n is from 1 to 1000, wherein said compound is not aluminum stearate.

9. A method of making an ink toner, comprising:
grinding a carrier liquid, a resin, and a pigment, to form a slurry; and
mixing a charge adjuvant and a charge director with the ink slurry after grinding, wherein the charge adjuvant is a polymeric organometallic compound, wherein the polymeric organometallic compound is a polymer of a polyoxoaluminum stearate, wherein said toner does not include aluminum stearate.

* * * * *

UNITED STATES PATENT AND TRADEMARK OFFICE
CERTIFICATE OF CORRECTION

PATENT NO. : 7,951,520 B2
APPLICATION NO. : 11/651279
DATED : May 31, 2011
INVENTOR(S) : Elliad Silcoff et al.

It is certified that error appears in the above-identified patent and that said Letters Patent is hereby corrected as shown below:

In column 20, line 43, in Claim 8, delete "polyunsatuareted" and insert -- polyunsaturated --, therefor.

In column 20, line 45, in Claim 8, delete "heteroaromatrics," and insert -- heteroaromatics, --, therefor.

Signed and Sealed this
Eighth Day of November, 2011

David J. Kappos
*Director of the United States Patent and Trademark Office*